United States Patent
Kurosu et al.

(10) Patent No.: US 10,250,008 B2
(45) Date of Patent: Apr. 2, 2019

(54) DISCHARGE EXCITATION GAS LASER APPARATUS

(71) Applicant: Gigaphoton Inc., Tochigi (JP)

(72) Inventors: Akihiko Kurosu, Oyama (JP); Fumio Kawamata, Oyama (JP)

(73) Assignee: Gigaphoton Inc., Tochigi (JP)

( * ) Notice: Subject to any disclaimer, the term of this patent is extended or adjusted under 35 U.S.C. 154(b) by 1 day.

(21) Appl. No.: 15/671,580

(22) Filed: Aug. 8, 2017

(65) Prior Publication Data

US 2017/0338616 A1 Nov. 23, 2017

Related U.S. Application Data

(63) Continuation of application No. PCT/JP2015/057373, filed on Mar. 12, 2015.

(51) Int. Cl.
*H01S 3/13* (2006.01)
*F16C 32/04* (2006.01)
(Continued)

(52) U.S. Cl.
CPC .......... *H01S 3/036* (2013.01); *F16C 32/0446* (2013.01); *F16C 32/0455* (2013.01); *F16C 32/0485* (2013.01); *F16C 32/0489* (2013.01); *H01S 3/038* (2013.01); *H01S 3/08009* (2013.01); *H01S 3/1305* (2013.01);
(Continued)

(58) Field of Classification Search
CPC .............. H01S 3/036; F16C 32/0444–32/0455
See application file for complete search history.

(56) References Cited

U.S. PATENT DOCUMENTS 4,300,807 A * 11/1981 Poubeau ............. F16C 32/0444
310/83
5,848,089 A 12/1998 Sarkar et al.
(Continued)

FOREIGN PATENT DOCUMENTS

JP H11-87810 A 3/1999
JP 2000-307175 A 11/2000
(Continued)

OTHER PUBLICATIONS

International Search Report issued in PCT/JP2015/057373; dated Jun. 9, 2015.
Written Opinion issued in PCT/JP2015/057373; dated Jun. 9, 2015.

*Primary Examiner* — Xinning (Tom) Niu
*Assistant Examiner* — Sean P Hagan
(74) *Attorney, Agent, or Firm* — Studebaker & Brackett PC

(57) ABSTRACT

A discharge excitation gas laser device may include a laser chamber in which a laser gas containing a halogen gas is encapsulated, a pair of discharge electrodes disposed to face each other inside the laser chamber, a fan disposed inside the laser chamber to make the laser gas flow between the pair of discharge electrodes, a motor for rotating the fan, a motor power supply for supplying power to the motor, a magnetic bearing configured to levitate the rotary shaft of the fan magnetically, a displacement sensor for detecting the position of the rotary shaft through a can, and a controller configured to measure the rotational speed of the fan on the basis of a detection signal from the displacement sensor and control the motor power supply in such a manner that the measured rotational speed becomes a target rotational speed.

6 Claims, 28 Drawing Sheets

(51) Int. Cl.
      *H01S 3/036*   (2006.01)
      *H01S 3/225*   (2006.01)
      *H01S 3/08*    (2006.01)
      *H01S 3/038*   (2006.01)

(52) U.S. Cl.
      CPC ......... *F16C 2360/46* (2013.01); *H01S 3/1306* (2013.01); *H01S 3/225* (2013.01)

(56) References Cited

U.S. PATENT DOCUMENTS

| | | |
|---|---|---|
| 6,366,039 B1 | 4/2002 | Sekiguchi et al. |
| 2002/0036435 A1 | 3/2002 | Ooyama et al. |
| 2005/0169563 A1* | 8/2005 | Inoue .................... B60B 27/00 384/448 |
| 2009/0246715 A1 | 10/2009 | Kouchi et al. |
| 2013/0328455 A1* | 12/2013 | Wu .................... F16C 32/0446 310/68 B |
| 2014/0105238 A1 | 4/2014 | Kurosu et al. |

FOREIGN PATENT DOCUMENTS

| | | |
|---|---|---|
| JP | 2002-089560 A | 3/2002 |
| JP | 2004-173468 A | 6/2004 |
| JP | 3766230 B2 | 4/2006 |
| JP | 4003338 B2 | 11/2007 |
| JP | 2008-082546 A | 4/2008 |
| JP | 2014-082243 A | 5/2014 |

\* cited by examiner

ROTATIONAL SPEED MEASUREMENT PROCESS (S6)

DISCHARGE EXCITATION GAS LASER APPARATUS

CROSS-REFERENCE TO RELATED APPLICATIONS

This application is a continuation application of International Application No. PCT/JP2015/057373 filed on Mar. 12, 2015. The content of the application is incorporated herein by reference in its entirety.

BACKGROUND

1. Technical Field

The disclosure relates to a discharge excitation gas laser apparatus.

2. Related Art

With miniaturization and high integration of a semiconductor integrated circuit, improvement of resolution is demanded in a semiconductor exposure apparatus (hereinafter, referred to as an "exposure apparatus"). Accordingly, the wavelength of light emitted from a light source for exposure is being shortened. As the light source for exposure, a gas laser apparatus is used in place of an existing mercury lamp. As a gas laser apparatus for exposure, a KrF excimer laser apparatus that emits ultraviolet rays of a wavelength of 248 nm and an ArF excimer laser apparatus that emits ultraviolet rays of a wavelength of 193 nm are currently employed.

As a current exposure technology, liquid immersion exposure has been used in practice, wherein a gap between a projection lens on an exposure apparatus side and a wafer is filled with a liquid to change the refractive index of the gap, thereby shortening the apparent/virtual wavelength of the light source for exposure. In the liquid immersion exposure using the ArF excimer laser apparatus as the light source for exposure, ultraviolet rays having a wavelength of 134 nm in water/liquid is applied to the wafer. This technology is called ArF liquid immersion exposure or ArF liquid immersion lithography.

Because the spectrum line width in natural oscillations of the KrF and ArF excimer laser apparatuses is so wide, about 350 pm to about 400 pm, that a color aberration occurs in the laser light (ultraviolet rays) as projected in a reduced size on the wafer through the projection lens on the exposure apparatus side, degrading the resolution. Therefore, it is necessary to narrow the spectrum line width of the laser light emitted from the gas laser apparatus such that the color aberration becomes ignorable. The spectrum line width is also called the spectrum width. Accordingly, a line narrowing module (LNM) having a line narrowing element is provided in a laser resonator of the gas laser apparatus, to achieve narrowing the spectrum width by the line narrowing module. Note that the line narrowing element may include an etalon, a grating and the like. The laser apparatus with a spectrum width narrowed in this way is called a narrowband laser apparatus

CITATIONS

Patent Literature

PTL 1: Japanese Patent No. 3766230
PTL 2: Japanese Patent Application Publication No. 2014-82243
PTL 3: Japanese Patent Application Publication No. H11-87810
PTL 4: Japanese Patent Application Publication No. 2008-82546
PTL 5: Japanese Patent No. 4003338

SUMMARY

A discharge excitation gas laser apparatus according to one aspect of the present disclosure may include a laser chamber in which a laser gas containing a halogen gas is encapsulated, a pair of discharge electrodes disposed to face each other in the laser chamber, a fan disposed in the laser chamber to make the laser gas flow between the pair of discharge electrodes, a motor for rotating the fan, a motor power supply for supplying power to the motor, a magnetic bearing configured to magnetically levitate a rotary shaft of the fan, a displacement sensor configured to detect the position of the rotary shaft through a can, and a controller configured to measure the rotational speed of the fan on the basis of the detection signal from the displacement sensor and control the motor power supply in such a manner that the measured rotational speed becomes a target rotational speed.

BRIEF DESCRIPTION OF DRAWINGS

Some embodiments of the disclosure will be described as an example below with reference to the accompanying drawings.

EMBODIMENTS

Figure 1:
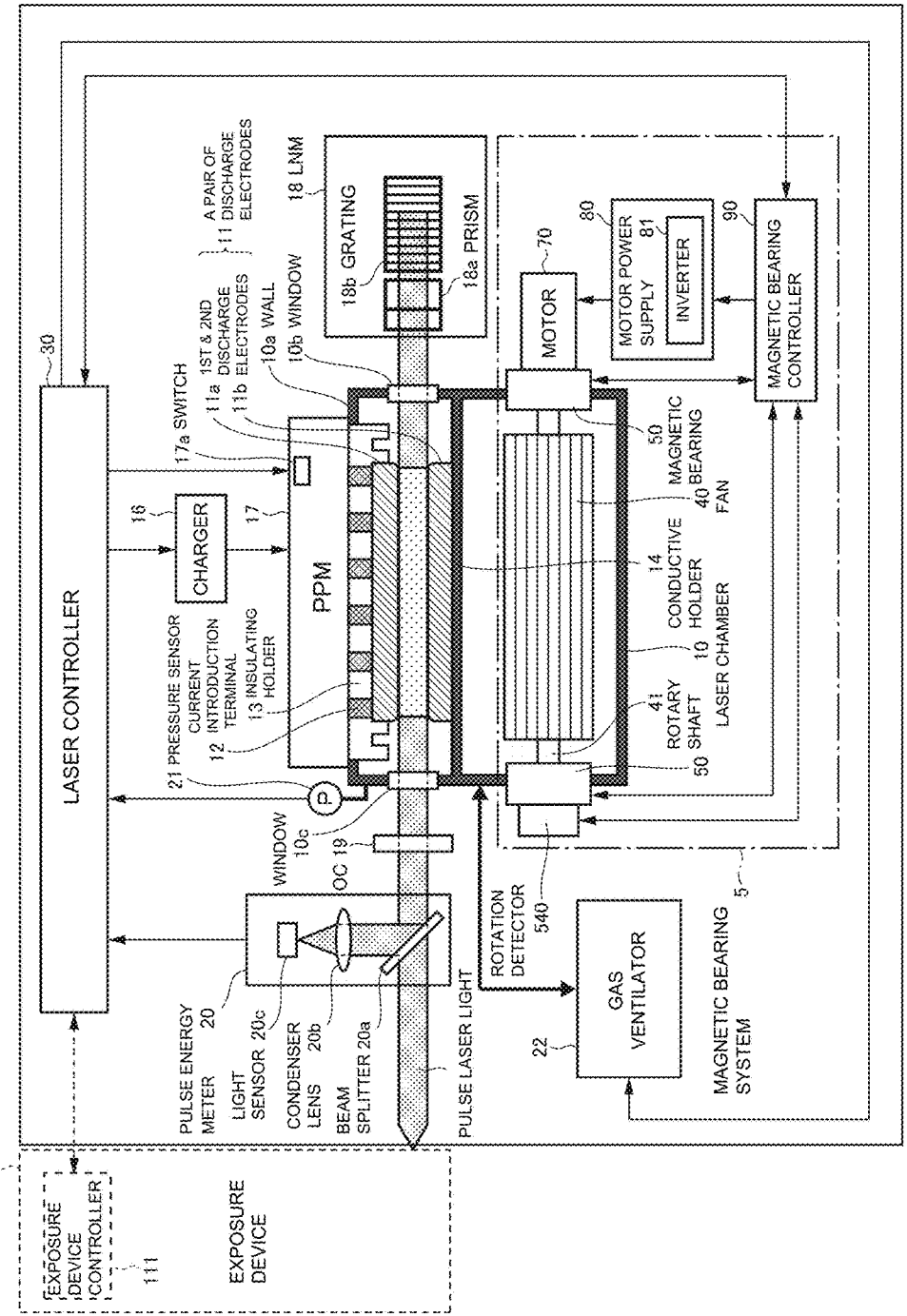
FIG. 1 is a diagram illustrating a gas laser apparatus provided with a magnetic bearing system.

Contents
1. Overview
2. Terms
3. Gas Laser Apparatus with Magnetic Bearing System
3.1 Configuration
3.2 Operation
4. Problem
5. Magnetic Bearing System provided in Gas Laser Apparatus of First Embodiment
5.1 Configuration
5.2 Operation
5.3 Effect
5.4 Modification 1 of First Embodiment
5.5 Modification 2 of First Embodiment
6. Magnetic Bearing System provided in Gas Laser Apparatus of Second Embodiment
7. Magnetic Bearing System provided in Gas Laser Apparatus of Third Embodiment
8. Magnetic Bearing System provided in Gas Laser Apparatus of Fourth Embodiment
8.1 Modification 1 of Fourth Embodiment
9. Others
9.1 Concrete Example of Displacement Sensor
9.2 Hardware Environment of Controllers
9.3 Other Modifications, etc.

In the following, some embodiments of the present disclosure will be described in detail with reference to the drawings. Embodiments described below each illustrate one example of the disclosure and are not intended to limit the contents of the disclosure. Also, all of the configurations and operations described in each embodiment are not necessarily essential for the configurations and operations of the disclosure. Note that like elements are denoted with the same reference numerals, and any redundant description thereof is omitted.

1. Overview

The present disclosure can at least disclose the following embodiments merely as examples.

A gas laser apparatus 1 according to the present disclosure may include a laser chamber 10 in which a laser gas containing a halogen gas is encapsulated, a pair of discharge electrodes 11 disposed to face each other in the laser chamber 10, a fan 40 disposed in the laser chamber 10 to make the laser gas flow between the pair of discharge electrodes 11, a motor 70 for rotating the fan 40, a motor power supply 80 for supplying power to the motor 70, a magnetic bearing 50 configured to magnetically levitate a rotary shaft 41 of the fan 40, a displacement sensor 60 configured to detect the position of the rotary shaft 41 through cans 561 and 571 to 574, and a controller 9 configured to measure the rotational speed of the fan 40 on the basis of a detection signal from the displacement sensor 60 and control the motor power supply 80 in such a manner that the measured rotational speed R becomes a target rotational speed Rt.

According to this configuration, the gas laser apparatus 1 can measure the rotational speed of the fan 40 properly with a simple structure, making it possible to reduce the cost.

2. Terms

"Optical path axis" is an axis extending in the traveling direction of the laser light through the center of the beam section of the laser light.

"Optical path" is a path along which the laser light travels. The optical path may include the optical path axis.

"Radial direction" is the radial direction of the rotary shaft.

"Axial direction" is the axial direction of the rotary shaft.

"Fan rotating about the center of inertia" means that the magnetically levitated rotary shaft of the fan rotates about an axis that extends through the gravity center of the fan.

"Fan rotating about the geometric center" means that the magnetically levitated rotary shaft of the fan rotates about an axis that extends through the geometric center of the fan.

"Controlling the center of inertia" is controlling the position of the rotary shaft of the fan in such a manner that the fan rotates about the center of inertia.

"Controlling the geometric center" is controlling the position of the rotary shaft of the fan such that the fan rotates about the geometric center.

"Can" is a thin partition wall that isolates the laser gas from the atmosphere.

"Inside of the can" is the laser gas side of the can.

"Outside of the can" is the atmosphere side of the can.

3. Gas Laser Apparatus with Magnetic Bearing System

A gas laser apparatus 1 provided with a magnetic bearing system 5 will be described using FIG. 1 to FIG. 3.

The gas laser apparatus 1 may be a discharge excitation gas laser apparatus. The gas laser apparatus 1 may be an excimer laser apparatus. The laser gas, which is a laser medium, may be composed of argon or krypton or xenon as a rare gas, fluorine or chlorine as a halogen gas, neon or helium as a buffer gas, or a mixed gas thereof.

3.1 Configuration

FIG. 1 is a diagram illustrating the gas laser apparatus 1 provided with a magnetic bearing system 5.

In FIG. 1, the gas laser apparatus 1 may include a laser chamber 10, a charger 16, a pulse power module (PPM) 17, a laser resonator, a pulse energy meter 20, a pressure sensor 21, a gas ventilator 22, a laser controller 30 and the magnetic bearing system 5.

The magnetic bearing system 5 may be a control system configured to magnetically levitate a rotary shaft 41 of a fan 40 and control the revolution of the fan 40.

The laser chamber 10 may have a laser gas encapsulated therein.

Walls 10a that form an internal room of the laser chamber 10 may be formed, for example, of a metal material, such as an aluminum metal. The surface of the metal material may be treated with nickel plating, for example.

The wall 10a of the laser chamber 10 may be grounded to the earth.

The laser chamber 10 may include a pair of discharge electrodes 11, a current introduction terminal 12, an insulating holder 13, a conductive holder 14 and the fan 40.

The pair of discharge electrodes 11 may include a first discharge electrode 11a and a second discharge electrode 11b.

The first and second discharge electrodes 11a and 11b may be electrodes for exciting the laser gas with main electric discharge. The main electric discharge may be glow discharge.

The first and second discharge electrodes 11a and 11b may be formed each from a metal material including copper for use with a halogen gas containing fluorine, or from a metal material including nickel for use with a halogen gas containing chlorine.

The first and second discharge electrodes 11a and 11b may be spaced a given distance from each other and arranged to face each other with the longitudinal direction thereof in parallel to each other.

One side of the first discharge electrode 11a facing the second discharge electrode 11b and one side of the second discharge electrode 11b facing the first discharge electrode 11a may also be called the "discharge surface" each.

A space between the discharge surface of the first discharge electrode 11a and the discharge surface of the second discharge electrode 11b may also be called the "discharge space".

One end of the current introduction terminal 12 may be connected to a bottom surface of the first discharge electrode 11a, which is on the opposite side from the discharge surface.

The other end of the current introduction terminal 12 may be electrically connected to a pulse power module 17.

The insulating holder 13 may hold the first discharge electrode 11a and the current introduction terminal 12 so as to surround the side surfaces of the first discharge electrode 11a and the current introduction terminal 12.

The insulating holder 13 may be formed of an insulation member that is less responsive to the laser gas. In the case where the laser gas contains fluorine or chlorine, the insulating holder 13 may be formed of high purity alumina ceramics, for example.

The insulating holder 13 may be put through the wall 10a of the laser chamber 10 and secured to the wall 10a.

The insulating holder 13 may electrically insulate the first discharge electrode 11a and the current introduction terminal 12 from the wall 10a of the laser chamber 10.

The conductive holder 14 may be connected to an opposite surface of the second discharge electrode 11b to the discharge surface, and may hold the second discharge electrode 11b.

The conductive holder 14 may be formed of a metal material including aluminum, copper and the like. The surface of the conductive holder may be treated with nickel plating, for example.

The conductive holder 14 may be secured to the wall 10a of the laser chamber 10.

The conductive holder 14 may be electrically connected to the wall 10a of the laser chamber 10 through a not-shown wiring.

The fan 40 may cause the laser gas to circulate inside the laser chamber 10.

The fan 40 may be a cross-flow fan.

The fan 40 may be arranged such that the longitudinal direction of the fan 40 is approximately parallel to the longitudinal direction of the first and second discharge electrodes 11a and 11b.

The rotary shaft 41 of the fan 40 may be supported by a magnetic bearing 50.

The rotary shaft 41 of the fan 40 may be connected to a motor 70.

The detailed configuration of the magnetic bearing system 5 including the magnetic bearing 50 and the motor 70 will be described using FIG. 2.

The charger 16 may be a DC power supply device configured to charge a not-shown charge capacitor included in the pulse power module 17 at a predetermined voltage.

The operation of the charger 16 may be controlled by the laser controller 30.

The pulse power module 17 may apply a high voltage in the form of a pulse across the first and second discharge electrodes 11a and 11b.

The pulse power module 17 may include a switch 17a that is controlled by the laser controller 30.

When the switch 17a is turned from OFF to ON, the pulse power module 17 may cause the charge capacitor, having been charged by the charger 16, to discharge, generating a high-voltage pulse from a magnetic compressor circuit which is connected to the charge capacitor. Then, the pulse power module 17 may apply the generated high-voltage pulse across the first and second discharge electrodes 11a and 11b.

The laser resonator may be constituted of a line narrowing module (LNM) 18 and an output coupler (OC) 19.

The line narrowing module 18 may include a prism 18a and a grating 18b.

The prism 18a may enlarge the beam width of light emitted from the laser chamber 10 through a window 10b. The prism 18a may transmit the enlarged beam therethrough toward the grating 18b.

The grating 18b may be a chromatic dispersion element having a large number of grooves formed at regular intervals on the surface thereof.

The grating 18b may be disposed in Littrow arrangement such that the incident angle and the diffraction angle become equal to each other.

From among the light transmitted through the prism 18a, the grating 18b may sort out light components around a particular wavelength according to the diffraction angle, and may feed the sorted rays back into the laser chamber 10. Thereby, the spectral width of the light returning from the grating 18b to the laser chamber 10 can be narrowed.

The output coupler 19 may transmit part of the light projected through the window 10c from the laser chamber 10, and may reflect other part of the light back into the laser chamber 10.

The surface of the output coupler 19 may be coated with a partial reflection film.

The pulse energy meter 20 may measure the pulse energy of the pulse laser light that has transmitted through the output coupler 19.

The pulse energy meter 20 may include a beam splitter 20a, a condenser lens 20b and a light sensor 20c.

The beam splitter 20a may be located on the optical path of the pulse laser light. The beam splitter 20a may transmit the pulse laser light with a high transmittance toward an exposure device 110 after the pulse laser light is transmitted through the output coupler 19. The beam splitter 20a may reflect part of the pulse laser light, transmitted through the output coupler 19, toward the condenser lens 20b.

The condenser lens 20b may focus the pulse laser light as reflected from the beam splitter 20a on a light reception surface of the light sensor 20c.

The light sensor 20c may detect the pulse laser light as focused on the light reception surface. The light sensor 20c may measure the pulse energy of the detected pulse laser light. The light sensor 20c may output a signal repetitive of the measured pulse energy to the laser controller 30.

The pressure sensor 21 may detect the gas pressure in the laser chamber 10.

The pressure sensor 21 may output the detection signal of the detected gas pressure to the laser controller 30.

The gas ventilator 22 may supply the laser gas into the laser chamber 10.

The gas ventilator 22 may exhaust the laser gas from the inside of the laser chamber 10 to the outside thereof.

The operation of the gas ventilator 22 may be controlled by the laser controller 30.

The laser controller 30 may communicate various kinds of signals with an exposure device controller 111 provided in the exposure device 110.

For example, the laser controller 30 may receive from the exposure device controller 111 a signal instructing preparation for a laser oscillation. The exposure device controller 111 may also send the laser controller 30 signals relating to a target pulse energy and a target oscillation timing of the pulse laser light to be output to the exposure device 110.

The laser controller 30 may comprehensively control the respective operations of the components of the gas laser apparatus 1 on the basis of the various kinds of signals from the exposure device controller 111.

Hardware configurations of the laser controller 30 and the exposure device controller 111 will be described later, using FIG. 28.

Figure 2:
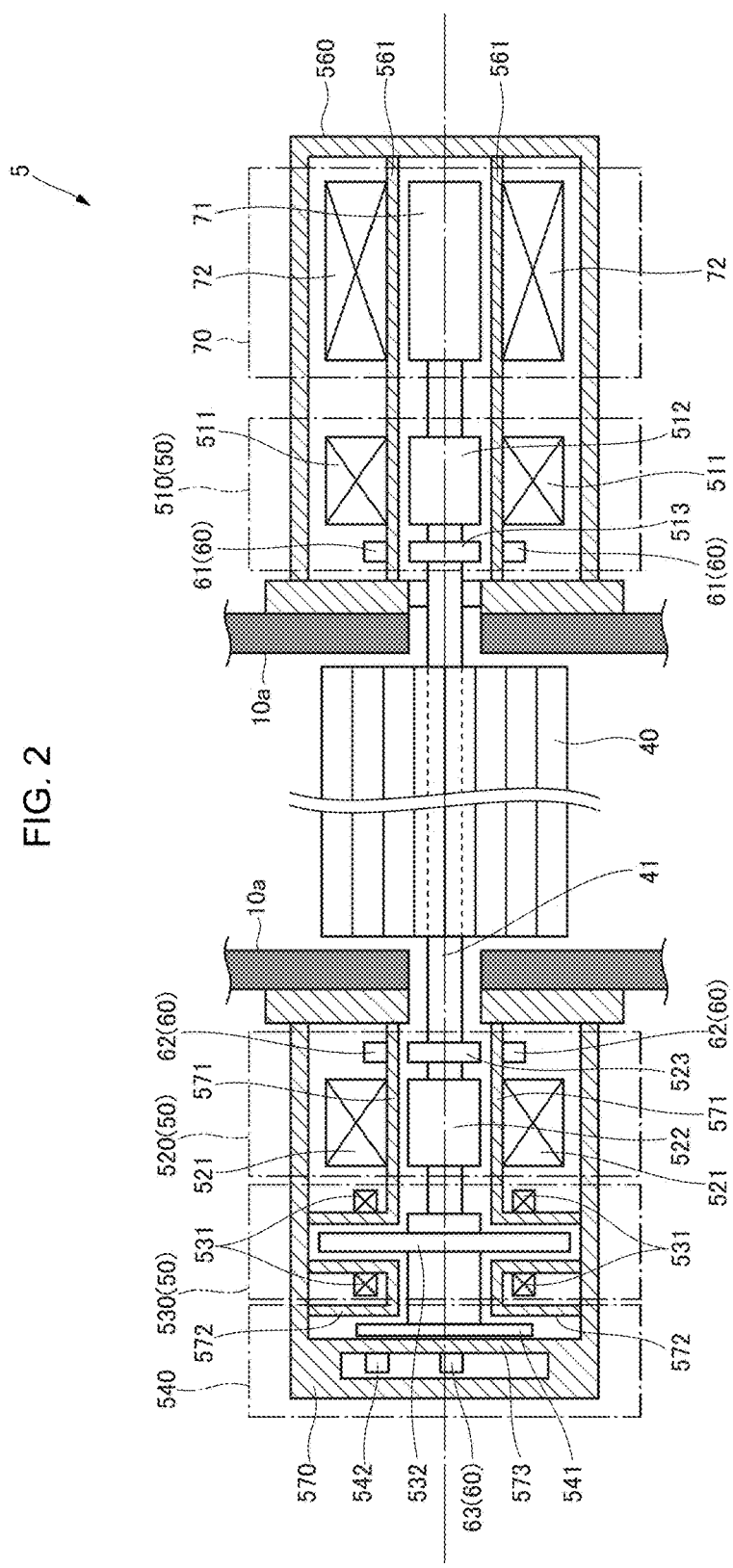
FIG. 2 is a diagram illustrating a configuration of the magnetic bearing system shown in FIG. 1.

FIG. 2 is a diagram illustrating a configuration of the magnetic bearing system 5 shown in FIG. 1.

As described above, the magnetic bearing system 5 may be a control system configured to magnetically levitate the rotary shaft 41 of the fan 40 and control the revolution of the fan 40.

The magnetic bearing system 5 may include a magnetic bearing 50, a displacement sensor 60, a motor 70, a motor power supply 80, a magnetic bearing controller 90 and an amplifier 91.

The motor power supply 80, the magnetic bearing controller 90 and the amplifier 91 will be described later, using FIG. 3.

The magnetic bearing 50 may magnetically levitate the rotary shaft 41 of the fan 40. The magnetic bearing 50 may support the rotary shaft 41 in a contactless and rotatable manner while magnetically levitating the rotary shaft 41.

The magnetic bearing 50 may include a first radial magnetic bearing section 510, a second radial magnetic bearing section 520, an axial magnetic bearing section 530, a rotation detector section 540, a casing 560 and a casing 570.

The casings 560 and 570 may be each formed into a substantially cylindrical hollow shape with an open bottom side.

The casings 560 and 570 may be disposed respectively on opposite walls 10a of the laser chamber 10, which face each other.

A center portion of the internal room of the casing 560 may interconnect with the inside of the laser chamber 10. A peripheral portion of the internal room of the casing 560 may be isolated from the center portion that interconnects with the inside of the laser chamber 10 by a can 561 which is air-tightly bonded to an inner circumferential surface of the casing 560.

A center portion of the internal room of the casing 570 may interconnect with the inside of the laser chamber 10. A peripheral portion of the internal room of the casing 570 may be isolated from the center portion that interconnects with the inside of the laser chamber 10 by cans 571 and 572 which are air-tightly bonded to an inner circumferential surface of the casing 570.

A bottom portion of the internal room of the casing 570 may be isolated from the center portion interconnected with the inside of the laser chamber 10, by means of a can 573 which is air-tightly bonded to a bottom inner surface of the casing 570.

In other words, the outsides of the cans 561 and 571 to 573 may be isolated from the inside of the laser chamber 10 in which the laser gas is encapsulated.

The cans 561 and 571 to 573 may be formed of a metal material that hardly reacts with the laser gas. For example, the cans 561 and 571 to 573 may be formed of stainless steel.

The casings 560 and 570 may respectively accommodate opposite ends of the rotary shaft 41, which are arranged to extend respectively through the opposite walls 10a of the laser chamber 10 in the center portion of the internal room of the casings 560 and 570.

The casing 560 may contain the first radial magnetic bearing section 510 and the motor 70.

The casing 570 may contain the second radial magnetic bearing section 520, the axial magnetic bearing section 530 and the rotation detector section 540.

The first and second radial magnetic bearing sections 510 and 520 may magnetically levitate the rotary shaft 41 in the radial direction of the rotary shaft 41.

The first radial magnetic bearing section 510 may include a first radial electromagnet 511, a first electromagnet target 512 and a first sensor target 513.

The second radial magnetic bearing section 520 may include a second radial electromagnet 521, a second electromagnet target 522 and a second sensor target 523.

The first electromagnet target 512 may be formed of a magnetic material that is hard to react with the laser gas. For example, the first electromagnet target 512 may be formed of permalloy.

The first electromagnet target 512 may be formed into a substantially cylindrical shape.

The first electromagnet target 512 may be fixed on the periphery of the rotary shaft 41 at a position located in the casing 560.

The first radial electromagnet 511 may be spaced a predetermined distance in the radial direction from the first electromagnet target 512 as fixed on the rotary shaft 41.

The first radial electromagnet 511 may be located outside the can 561 in the casing 560.

The first radial electromagnet 511 may be disposed around the first electromagnet target 512 that is fixed on the rotary shaft 41.

The first radial electromagnet 511 may be disposed to face the first electromagnet target 512 fixed on the rotary shaft 41, across the can 561.

The first radial electromagnet 511 may consist of multiple electromagnets. The first radial electromagnets 511 may consist of four electromagnets, for example. The multiple electromagnets constituting the first radial electromagnet 511 may be spaced from each other at approximately equal intervals in the circumferential direction of the rotary shaft 41.

The operation of the first radial electromagnet 511 may be controlled by the magnetic bearing controller 90.

The first sensor target 513 may be formed of a metal material that hardy reacts with the laser gas. The first sensor target 513 may be formed of at least one of copper, nickel, gold, aluminum and permalloy, for example, and the surface may be treated with nickel platting.

The first sensor target 513 may be formed into a substantially cylindrical shape.

The first sensor target 513 may be fixed on the periphery of the rotary shaft 41 at a position located in the casing 560. The position of the first sensor target 513 fixed on the rotary shaft 41 may be between the first electromagnet target 512 and the wall 10a of the laser chamber 10.

The second electromagnet target 522 may be formed of the substantially same material into the substantially same shape as the first electromagnet target 512.

The second electromagnet target 522 may be fixed on the periphery of the rotary shaft 41 at a position located in the casing 570.

Like the first radial electromagnet 511, the second radial electromagnet 521 may be spaced a predetermined distance in the radial direction from the second electromagnet target 522 fixed on the rotary shaft 41.

Like the first radial electromagnet 511, the second radial electromagnet 521 may be located outside the can 571 in the casing 570.

Like the first radial electromagnet 511, the second radial electromagnet 521 may be disposed around the second electromagnet target 522 fixed on the rotary shaft 41.

Like the first radial electromagnet 511, the second radial electromagnet 521 may be disposed to face the second electromagnet target 522 fixed on the rotary shaft 41, across the can 571.

Like the first radial electromagnet 511, the second radial electromagnet 521 may consist of multiple electromagnets. For example, the second radial electromagnets 521 may consist of four electromagnets. The multiple electromagnets constituting the second radial electromagnet 521 may be spaced from each other at approximately equal intervals in the circumferential direction of the rotary shaft 41.

The operation of the second radial electromagnet 521 may be controlled by the magnetic bearing controller 90.

The second sensor target 52 may be formed of the substantially same material into the substantially same shape as the first sensor target 513.

The second sensor target 523 may be fixed on the periphery of the rotary shaft 41 at a position located in the casing 570. The position of the second sensor target 523 fixed on the rotary shaft 41 may be between the wall 10a of the laser chamber 10 and the second electromagnet target 522.

The axial magnetic bearing section 530 may magnetically levitate the rotary shaft 41 in the axial direction of the rotary shaft 41.

The axial magnetic bearing section 530 may include an axial electromagnet 531 and a disk 532.

The disk 532 may be a target of the axial electromagnet 531.

The disk 532 may be formed of a magnetic material that hardly reacts with the laser gas. The disk 532 may be formed of permalloy, for example.

The disk 532 may be formed to have a substantially round shape.

The disk 532 may be fixed on the rotary shaft 41 at a position located in the casing 570. The position of the disk 532 fixed on the rotary shaft 41 may be on the opposite side of the second electromagnet target 522 from the wall 10a of the laser chamber 10.

The axial electromagnet 531 may be spaced a predetermined distance in the axial direction from the disk 532 fixed on the rotary shaft 41.

The axial electromagnets 531 may be disposed outside the cans 571 and 572 in the casing 570.

The axial electromagnets 531 may be arranged to sandwich the disk 532 fixed on the rotary shaft 41 in the axial direction, across the cans 571 and 572.

The axial electromagnets 531 may be arranged to face the disk 523 fixed on the rotary shaft 41, across the cans 571 and 572.

The axial electromagnets 531 may consist of multiple electromagnets. For example, the axial electromagnets 531 may consist of four electromagnets. The electromagnets constituting the axial electromagnet 531 may be spaced from each other at approximately equal intervals in the circumferential direction of the rotary shaft 41.

The operation of the axial electromagnet 531 may be controlled by the magnetic bearing controller 90.

The rotation detector section 540 may detect the rotation of the fan 40.

The rotation detector section 540 may include the same configuration as that of a rotational speed detection device described in the prior art document "Japanese Patent No. 4003338".

The rotation detector section 540 may include a disk 541 and a rotation sensor 542.

The disk 541 may be a target of the rotation sensor 542 and an axial displacement sensor 63 as will be described later.

The disk 541 may be formed of a magnetic material that hardly reacts with the laser gas. For example, the disk 541 may be formed of permalloy.

The disk 541 may be formed to have a substantially round shape.

The disk 541 may be formed to have at least a slit, like a disk described in the prior art document "Japanese Patent No. 4003338".

The disk 541 may be fixed on the periphery of the rotary shaft 41 at a position located in the casing 570. The position at which the disk 541 is fixed on the rotary shaft 41 may be an end of the rotary shaft 41.

The rotation sensor 542 may be configured by winding a coil around a magnetic body.

As the disk 541 with the slit turns, an electromotive power can be induced on the coil of the rotation sensor 542 and a current correspondingly induced in the form of a pulse can flow through the coil. If the disk 541 is formed to have a single slit, an induced current pulse can flow through the coil every time the fan 40 makes one revolution. Thus, the rotation sensor 542 can detect the rotation of the fan 40.

The rotation sensor 542 may output a detection signal to the magnetic bearing controller 90 for one revolution of the fan 40.

The rotation sensor 542 may be spaced a predetermined distance in the axial direction from the disk 541 fixed on the rotary shaft 41.

The rotation sensor 542 may be disposed outside the can 573 in the casing 570.

The rotation sensor 542 may be disposed to face the disk 541 fixed on the rotary shaft 41 across the can 573.

The rotation sensor 542 may be disposed to face the disk 541 at a position radially outward from the center of the disk 541 fixed on the rotary shaft 41. The rotation sensor 542 may be disposed to face the slit formed in the disk 541, across the can 574.

The displacement sensor 60 may detect the position of the rotary shaft 41 that is supported by the magnetic bearing 50.

The displacement sensor 60 may include a first radial displacement sensor 61, a second radial displacement sensor 62 and an axial displacement sensor 63.

The first radial displacement sensor 61 may detect the position of the first sensor target 513 in the radial direction.

The first radial displacement sensor 61 may output a detection signal relating to the detected position of the first sensor target 513 to the magnetic bearing controller 90.

The first radial displacement sensor 61 may be spaced a predetermined distance in the radial direction from the first sensor target 513 fixed on the rotary shaft 41.

The first radial displacement sensor 61 may be disposed outside the can 561 in the casing 560.

The first radial displacement sensor 61 may be disposed around the first sensor target 513 fixed on the rotary shaft 41.

The first radial displacement sensor 61 may be disposed to face the first sensor target 513 fixed on the rotary shaft 41, across the can 561.

The first radial displacement sensor 61 may consist of multiple displacement sensors. For example, the first radial displacement sensors 61 may consist of four displacement sensors. The multiple displacement sensors constituting the first radial displacement sensor 61 may be spaced at approximately equal intervals in the circumferential direction of the rotary shaft 41.

The second radial displacement sensor 62 may detect the position of the second sensor target 523 in the radial direction.

The second radial displacement sensor 62 may output a detection signal relating to the position of the second sensor target 523 to the magnetic bearing controller 90.

Like the first radial displacement sensor 61, the second radial displacement sensor 62 may be spaced a predetermined distance in the radial direction from the second sensor target 523 fixed on the rotary shaft 41.

The second radial displacement sensor 62 may be disposed outside the can 571 in the casing 570.

Like the first radial displacement sensor 61, the second radial displacement sensor 62 may be disposed around the second sensor target 523 fixed on the rotary shaft 41.

Like the first radial displacement sensor 61, the second radial displacement sensor 62 may be disposed to face the second sensor target 523 fixed on the rotary shaft 41, across the can 571.

Like the first radial displacement sensor 61, the second radial displacement sensor 62 may consist of multiple displacement sensors. The second radial displacement sensors 62 may consist of four displacement sensors, for example. The multiple displacement sensors constituting the second radial displacement sensor 62 may be spaced at approximately equal intervals in the circumferential direction of the rotary shaft 41.

The axial displacement sensor 63 may detect the axial position of the disk 541.

The axial displacement sensor 63 may output a signal relating to the detected position of the disk 541 to the magnetic bearing controller 90.

The axial displacement sensor 63 may be spaced a predetermined distance in the axial direction from the disk 541 fixed on the rotary shaft 41.

The axial displacement sensor 63 may be disposed outside the can 573 in the casing 570.

The axial displacement sensor 63 may be disposed to face the disk 541 fixed on the rotary shaft 41, across the can 573.

The axial displacement sensor 63 may be disposed to face the disk 541 fixed on the rotary shaft 41 at about the center of the disk 541, across the can 574. The axial displacement sensor 63 may be disposed so as not to face the slit formed in the disk 541. The axial displacement sensor 63 may be disposed substantially on an extension line extending from the rotary shaft 41.

The motor 70 may rotate the fan 40.

The motor 70 may be an induction motor.

The motor 70 may include a rotor 71 and a stator 72.

The rotor 71 may be a rotor having a basket-shape.

A core constituting the rotor 71 may be formed of a magnetic material that hardly reacts with the laser gas. The core constituting the rotor 71 may be formed of permalloy, for example.

A rotor bar and an end ring, which constitute the rotor 71, may be formed of a metal material having a high electric conductivity. The rotor bar and the end ring constituting the rotor 71 may be formed of aluminum or copper, for example.

In the rotor 71, the rotor bar and the end ring, which surround the core, may be covered with a stainless tube.

The rotor 71 may be fixed on the periphery of the rotary shaft 41 at a position located in the casing 560. The rotor 71 may be fixed on the rotary shaft 41 in an end position of the rotary shaft 41.

The stator 72 may be an electromagnet that generates a rotating magnetic field as an alternating current flows therethrough.

The stator 72 may be spaced a predetermined distance in the radial direction from the rotor 71 fixed on the rotary shaft 41.

The stator 72 may be disposed outside the can 561 in the casing 560.

The stator 72 may be disposed to face the rotor 71 fixed on the rotary shaft 41, across the can 561.

Figure 3:
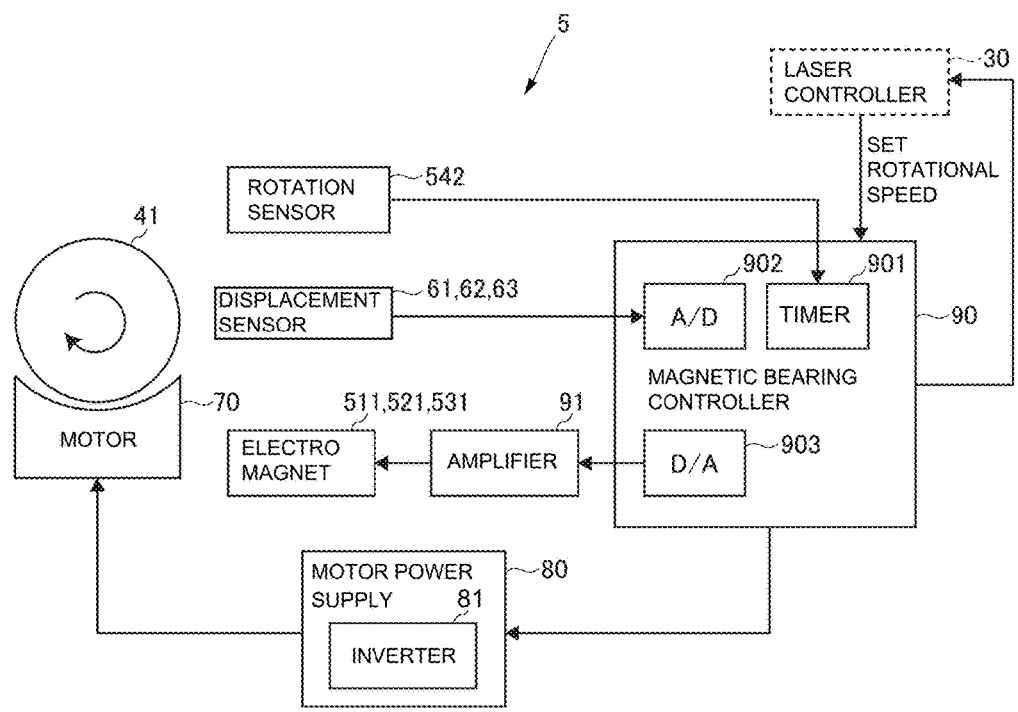
FIG. 3 is a diagram illustrating an electric configuration of the magnetic bearing system shown in FIG. 1.

FIG. 3 is a diagram illustrating an electric configuration of the magnetic bearing system 5 shown in FIG. 1.

The motor power supply 80 included in the magnetic bearing system 5 may be a power supply for supplying power to the motor 70.

The motor power supply 80 may include an inverter 81.

The inverter 81 may convert a direct current supplied from a not-shown DC power supply, converter or the like to an alternating current having appropriate output frequency and output voltage, to supply the same to the motor 70.

The operation of the motor power supply 80 including the inverter 81 may be controlled by the magnetic bearing controller 90.

The magnetic bearing controller 90 may be fed with various kinds of signals output from the laser controller 30.

For example, signals instructing magnetic levitation of the rotary shaft 41 and rotation of the fan 40 may be fed from the laser controller 30 to the magnetic bearing controller 90. A signal designating the target rotational speed of the fan 40 may be input to the magnetic bearing controller 90.

The magnetic bearing controller 90 may be fed with respective detection signals from the rotation sensor 542, the first radial displacement sensor 61, the second radial displacement sensor 62 and the axial displacement sensor 63.

The magnetic bearing controller 90 may control respective components of the magnetic bearing system 5 on the basis of the input signals of various kinds.

Specifically, the magnetic bearing controller 90 may use a not-shown power supply to conduct a biasing current for driving the first radial electromagnet 511, the second radial electromagnet 521 and the axial electromagnet 531. Thereby, the magnetic bearing 50 including these electromagnets can magnetically levitate the rotary shaft 41.

Furthermore, the magnetic bearing controller 90 may include a timer 901, an AD converter circuit 902 and a DA converter circuit 903.

The timer 901 may be electrically connected to the rotation sensor 542.

The AD converter circuit 902 may be electrically connected to each of the first radial displacement sensor 61, the second radial displacement sensor 62 and the axial displacement sensor 63.

The DA converter circuit 903 may be electrically connected to each of the first radial electromagnet 511, the second radial electromagnet 521 and the axial electromagnet 531 via the amplifier 91.

The magnetic bearing controller 90 may use the AD converter circuit 902 to convert respective analog detection signals from the first radial displacement sensor 61, the second radial displacement sensor 62 and the axial displacement sensor 63 into digital signals.

The magnetic bearing controller 90 may produce a digital control signal for controlling the position of the magnetically levitated rotary shaft 41 on the basis of the converted digital signals. The magnetic bearing controller 90 may use the DA converter circuit 903 to convert the digital control signal to an analog signal to output the same to the amplifier 91.

The amplifier 91 may amplify the output analog signal and output a control current for controlling the position of the rotary shaft 41. The control current from the amplifier 91 may be conducted through the first radial electromagnet 511, the second radial electromagnet 521 and the axial electromagnet 531. Thus, the magnetic bearing 50 including these electromagnets can change the position of the magnetically levitated rotary shaft 41 in accordance with the digital control signal produced by the magnetic bearing controller 90.

The magnetic bearing controller 90 may receive the detection signals which are output from the rotation sensor 542 a plurality of times, while measuring the intervals between the detection signals with the timer 901, thereby to measure the rotational speed of the fan 40.

Furthermore, the magnetic bearing controller 90 may control the motor power supply 80 including the inverter 81, so as to make the measured value of the rotational speed of the fan 40 closer to the target rotational speed designated by the laser controller 30. Specifically, the magnetic bearing controller 90 may control the output frequency and the output voltage of the inverter 81 using a control method, such as the V/f control method, in order to control the motor power supply 80 including the inverter 81. Thus, it is possible to control the speed of revolution and driving torque of the motor 70. As a result, it is possible to control the rotational speed of the fan 40 while controlling the power supplied to the motor 70.

Note that a hardware configuration of the magnetic bearing controller 90 will be described later using FIG. 28.

3.2 Operation

The operation of the gas laser apparatus 1 provided with the magnetic bearing system 5 shown in FIG. 1 to FIG. 3 will be described.

The laser controller 30 may receive the signal instructing preparation for a laser oscillation, which is transmitted from the exposure device controller 111.

The laser controller 30 may control the gas ventilator 22 so as to regulate the laser gas inside the laser chamber 10 to contain predetermined components and have a predetermined gas pressure.

The laser controller 30 may output the signals instructing magnetic levitation of the rotary shaft 41 and rotation of the fan 40 to the magnetic bearing controller 90. The laser controller 30 may output the signal designating the target rotational speed Rt of the fan 40 to the magnetic bearing controller 90.

The magnetic bearing controller 90 may control the magnetic bearing 50 so as to magnetically levitate the rotary shaft 41 of the fan 40.

The magnetic bearing controller 90 may control the magnetic bearing 50 so as to adjust the position of the magnetically levitated rotary shaft 41 to a desired position, on the basis of the respective detection signals from the first radial displacement sensor 61, the second radial displacement sensor 62 and the axial displacement sensor 63.

The magnetic bearing controller 90 may control the output frequency and output voltage of the inverter 81 and thus control the speed of revolution and driving torque of the motor 70 so as the fan 40 to rotate at the target rotational speed Rt.

The magnetic bearing controller 90 may measure the rotational speed of the fan 40 on the basis of the detection signal from the rotation sensor 542.

The magnetic bearing controller 90 may calculate a difference ΔR between the measured value R of the rotational speed of the fan 40 and the target rotational speed Rt designated by the laser controller 30.

The magnetic bearing controller 90 may control the output frequency and output voltage of the inverter 81 and thus control the speed of revolution and driving torque of the motor 70 such that the difference ΔR becomes 0. The magnetic bearing controller 90 can control the rotational speed of the fan 40 and the power supplied to the motor 70 so as the difference ΔR to be 0.

When the difference ΔR becomes 0, the magnetic bearing controller 90 may inform the laser controller 30 that the measured rotational speed R of the fan 40 reaches the target rotational speed Rt.

The laser controller 30 may receive signals relating to a target pulse energy Et and a target oscillation timing, which are sent from the exposure device controller 111.

The laser controller 30 may set a charge voltage Vhv at the charger 16 corresponding to the target pulse energy Et. The laser controller 30 may memorize the value of the charge voltage Vhv set at the charger 16.

The laser controller 30 may operate the switch 17a of the pulse power module 17 synchronously with the target oscillation timing. Thus, a high voltage is applied across a pair of discharge electrodes 11 in the form of a pulse, causing a main discharge to occur. When the main discharge occurs, the laser gas between the pair of discharge electrodes 11 is excited to emit light.

The light emitted from the laser gas can be reflected from the line narrowing module 18 and the output coupler 19, which constitute the laser resonator, reciprocating inside the laser resonator. The bandwidth of the light can be narrowed by the line narrowing module 18, while reciprocating inside the laser resonator. The light reciprocating inside the laser resonator can be amplified each time the light passes through between the pair of discharge electrodes 11.

Thereafter, part of the amplified light can transmit through the output coupler 19. The light transmitted through the output coupler 19 can be output as a pulse laser light to the exposure device 110.

The part of the pulse laser light transmitted through the output coupler 19 may enter the pulse energy meter 20. The pulse energy meter 20 may measure the pulse energy E of the pulse laser light and output the measured pulse energy value E to the laser controller 30.

The laser controller 30 may memorize the pulse energy value E measured by the pulse energy meter 20.

The laser controller 30 may calculate the difference ΔE between the measured pulse energy value E and the target pulse energy Et. The laser controller 30 may calculate the amount of change ΔVhv in charge voltage Vhv, which corresponds to the difference ΔE.

The laser controller 30 may calculate a newly-set charge voltage Vhv by adding a calculated amount of change ΔVhv to the previously-memorized charge voltage Vhv.

The laser controller 30 may newly set up the calculated charge voltage Vhv at the charger 16. Thus, the laser controller 30 may control the charge voltage Vhv while feeding back the measured value.

When the newly-set charge voltage Vhv exceeds an upper limit of a permissible range, the laser controller 30 may control the gas ventilator 22 to supply the laser gas to the inside of the laser chamber 10 till the gas pressure in the laser chamber 10 reaches a predetermined level.

Meanwhile, when the newly-set charge voltage Vhv gets lower than a lower limit of the permissible range, the laser controller 30 may control the gas ventilator 22 to exhaust the laser gas from the inside of the laser chamber 10 till the gas pressure reaches the predetermined level.

As the gas pressure inside the laser chamber 10 increases, the load torque of the motor 70 increases, making it sometimes difficult to maintain the rotational speed of the fan 40 at the target rotational speed Rt.

For this reason, the magnetic bearing controller 90 may newly measure the rotational speed of the fan 40 on the basis of the detection signal from the rotation sensor 542, and calculate the difference ΔR between the newly measured value R and the target rotational speed Rt.

Then, the magnetic bearing controller 90 may control the output frequency and output voltage of the inverter 81 to control the speed of revolution and driving torque of the motor 70 so as the difference ΔR to be 0. The magnetic bearing controller 90 can control the rotational speed of the fan 40 and the power supplied to the motor 70 so as the difference ΔR to be 0.

Thus, the magnetic bearing controller 90 can maintain the rotational speed of the fan 40 at the target rotational speed Rt even while the gas pressure inside the laser chamber 10 is changing.

In addition, the laser controller 30 may change the target rotational speed Rt of the fan 40. The laser controller 30 may output a signal designating a changed value of the target rotational speed Rt to the magnetic bearing controller 90.

Also in that case, the magnetic bearing controller 90 may measure the rotational speed of the fan 40 on the basis of the detection signal from the rotation sensor 542, and may control the output frequency and output voltage of the inverter 81 according to the difference ΔR of the measured value from the changed target rotational speed Rt.

4. Problem

In order to measure the rotational speed of the fan 40 in the magnetic bearing system 5 shown in FIG. 1 to FIG. 3, the magnetic bearing 50 may have to bother to include the disk 541, the rotation sensor 542 and the can 573.

For this reason, the magnetic bearing system 5 shown in FIG. 1 to FIG. 3 may have an increased number of parts and a complicated configuration, which will increase the cost. In particular, since the disk 541 is often formed of an expensive magnetic material such as permalloy, the increased cost of the magnetic bearing 50 can increase the total cost of the magnetic bearing system 5.

Furthermore, in the magnetic bearing system 5 shown in FIG. 1 to FIG. 3, the rotation sensor 542 may be disposed to face the disk 541 as a target. In that case, the rotation sensor 542 may be disposed to face the disk 541 across the can 573 so as not to be exposed to the laser gas. In order to improve the detection sensitivity of the rotation sensor 542, it may be necessary to reduce the distance between the rotation sensor 542 and the disk 541. Therefore, it may be necessary to reduce the plate thickness of the can 573 that exists between the rotation sensor 542 and the disk 541.

However, it may be difficult to reduce the plate thickness of the can 573. In addition, high dimensional accuracies may be demanded for peripheral parts around the rotation sensor 542 and the disk 541. Accordingly, the cost of the magnetic bearing 50 can increase to make the magnetic bearing system 5 costly.

For the reasons above, the cost of the gas laser apparatus 1 including the magnetic bearing system 5 shown in FIG. 1 to FIG. 3 can be high.

Therefore, there is a demand for such technologies that provide a magnetic bearing system 5 which is capable of measuring the rotational speed of a fan 40 properly even with a simple configuration, and thus save cost for a gas laser apparatus 1.

5. Magnetic Bearing System Provided in Gas Laser Apparatus of First Embodiment With reference to FIG. 4 to FIG. 10, a magnetic bearing system 5 provided in a gas laser apparatus 1 of the first embodiment will be described.

The magnetic bearing system 5 involved in the first embodiment may be different from the magnetic bearing system 5 shown in FIG. 1 to FIG. 3 mainly in features relating to a magnetic bearing 50.

Furthermore, the magnetic bearing system 5 involved in the first embodiment may be configured to have an additional rotation detecting circuit 95.

In the configuration of the gas laser apparatus 1 of the first embodiment, the description of similar features to those described with respect to the gas laser apparatus 1 shown in FIG. 1 to FIG. 3 will be omitted.

5.1 Configuration

Figure 4:
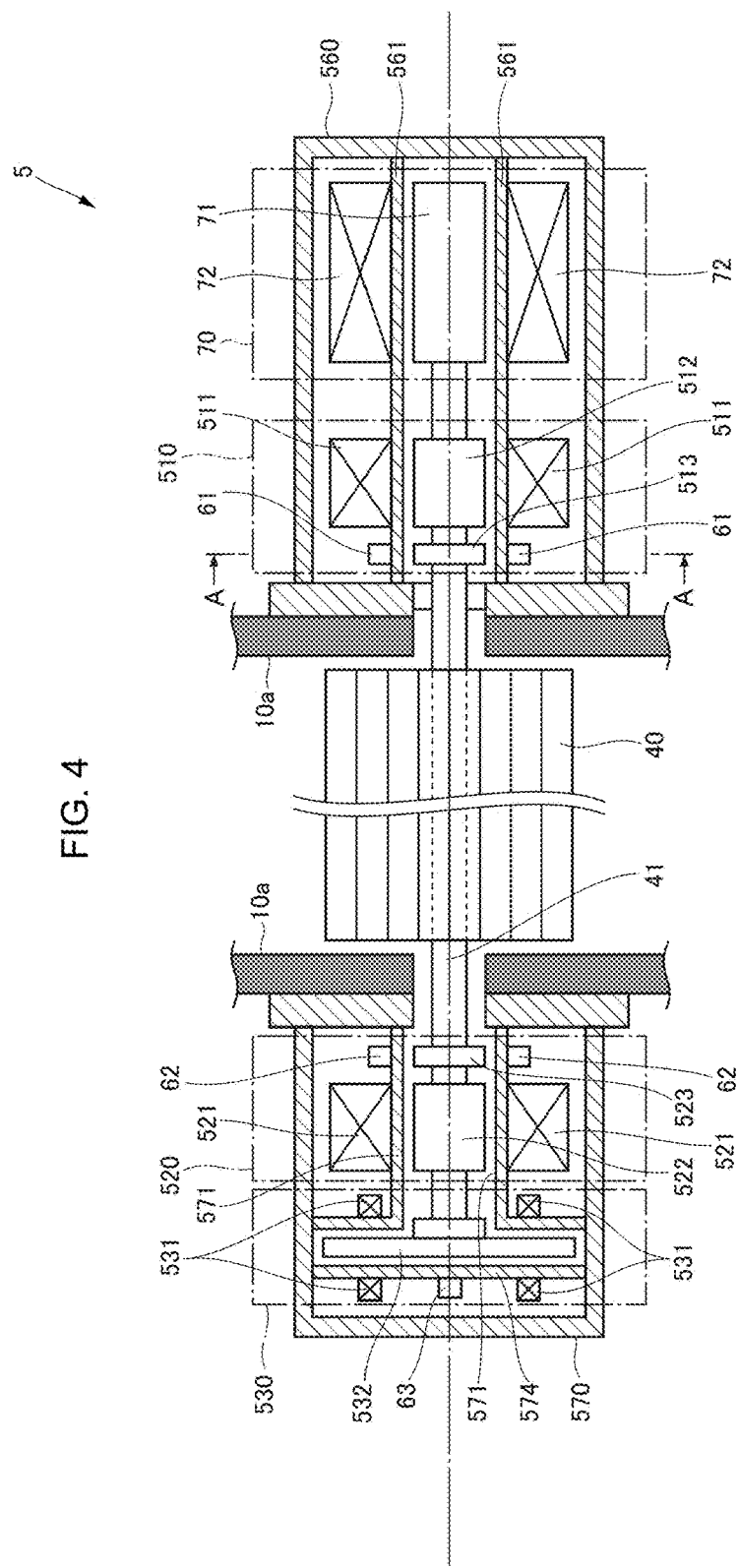
FIG. 4 is a diagram illustrating a configuration of a magnetic bearing system involved in a first embodiment.

FIG. 4 is a diagram illustrating a configuration of the magnetic bearing system 5 involved in the first embodiment.

In the magnetic bearing system 5 involved in the first embodiment, the magnetic bearing 50 is not always required to include the rotation detector section 540. That is, the magnetic bearing system 5 may not necessarily include the disk 541 and the rotation sensor 542.

Furthermore, the magnetic bearing system 5 involved in the first embodiment may include a can 574 in the casing 570 in place of the can 572 and 573.

In that case, an axial electromagnet 531 and an axial displacement sensor 63 may be disposed outside the can 574, these components having been disposed outside the can 572 and 573 in the magnetic bearing system 5 shown in FIG. 1 to FIG. 3.

The can 574 may be formed of a metal material that hardly reacts with the laser gas. For example, the can 574 may be formed of stainless steel.

The can 574 may be air-tightly bonded to an inner bottom surface of the casing 570.

The can 574 may isolate a bottom portion from a center portion of the interior of the casing 570, the center portion interconnecting with the inside of the laser chamber 10.

Axial electromagnets 531 may be arranged to sandwich a disk 532 fixed on the rotary shaft 41 in the axial direction, across the cans 571 and 574.

The axial electromagnets 531 may be arranged to face the disk 523 fixed on the rotary shaft 41, across the cans 571 and 574.

An axial displacement sensor 63 may detect the axial position of the disk 532.

The axial displacement sensor 63 may output a detection signal relating to the detected position of the disk 532 to a magnetic bearing controller 90.

The axial displacement sensor 63 may be spaced a predetermined distance in the axial direction from the disk 532 fixed on the rotary shaft 41.

The axial displacement sensor 63 may be disposed to face the disk 532 fixed on the rotary shaft 41, across the can 574.

The axial displacement sensor 63 may be disposed to face the disk 532 fixed on the rotary shaft 41 at about the center of the disk 532. The axial displacement sensor 63 may be disposed substantially on the extension line from the rotary shaft 41.

Figure 5:
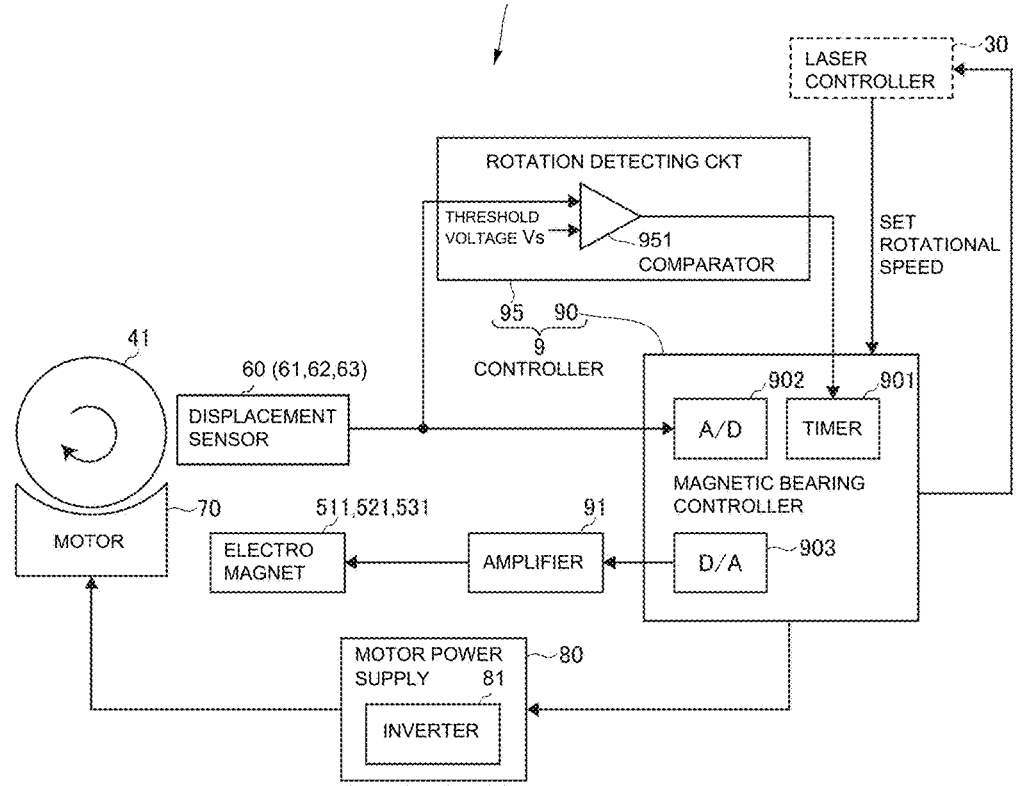
FIG. 5 is a diagram illustrating an electric configuration of the magnetic bearing system involved in the first embodiment.

FIG. 5 is a diagram illustrating an electric configuration of the magnetic bearing system 5 involved in the first embodiment.

The magnetic bearing system 5 involved in the first embodiment may be provided with a rotation detecting circuit 95.

In the present embodiment, a complex of the rotation detecting circuit 95 and the magnetic bearing controller 90 will be referred to as a controller 9.

The rotation detecting circuit 95 involved in the first embodiment may be a circuit that detects the revolution of a fan 40 on the basis of a detection signal from at least one of first and second radial displacement sensors 61 and 62.

The rotation detecting circuit 95 may have a configuration using a comparator 951.

An input of the comparator 951 may be connected to a signal line branched from one of multiple signal lines which respectively connect the first and second radial displacement sensors 61 and 62 to an AD converter circuit 902.

For example, the input of the comparator 951 may be connected to a signal line that is branched from a signal line connecting the first radial displacement sensor 61 to the AD converter circuit 902.

An output of the comparator 951 may be electrically connected to a timer 901.

Figure 6:
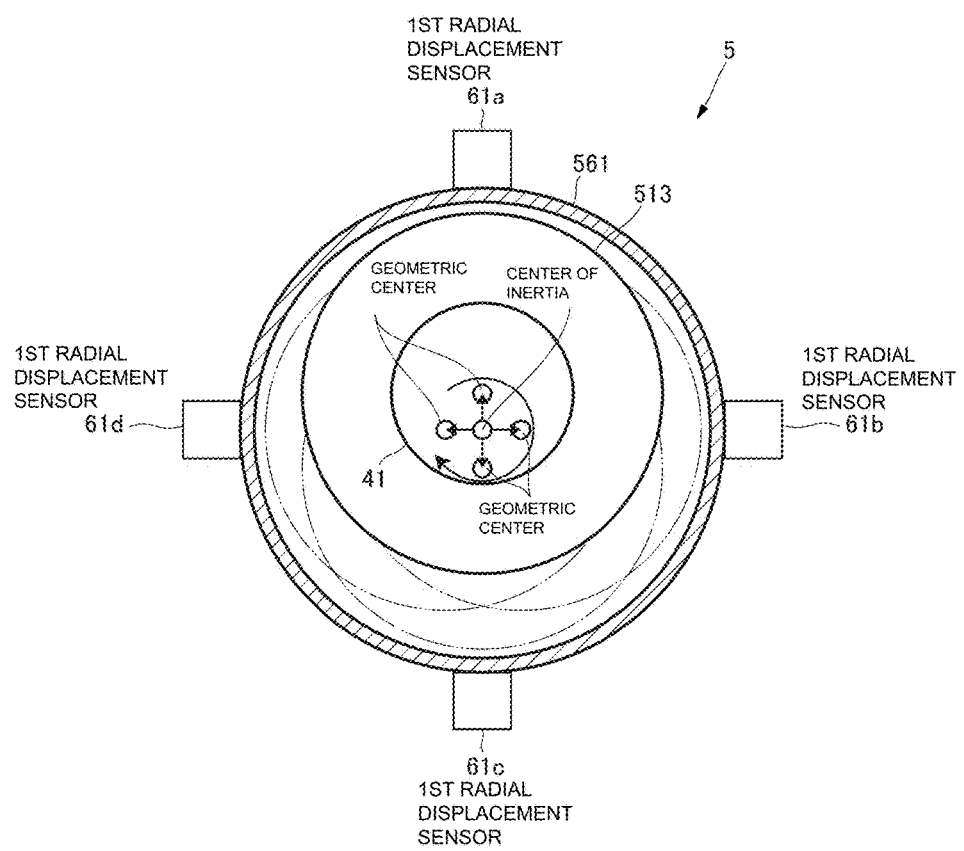
FIG. 6 is a sectional view taken along a line A-A shown in FIG. 4.
Figure 7:
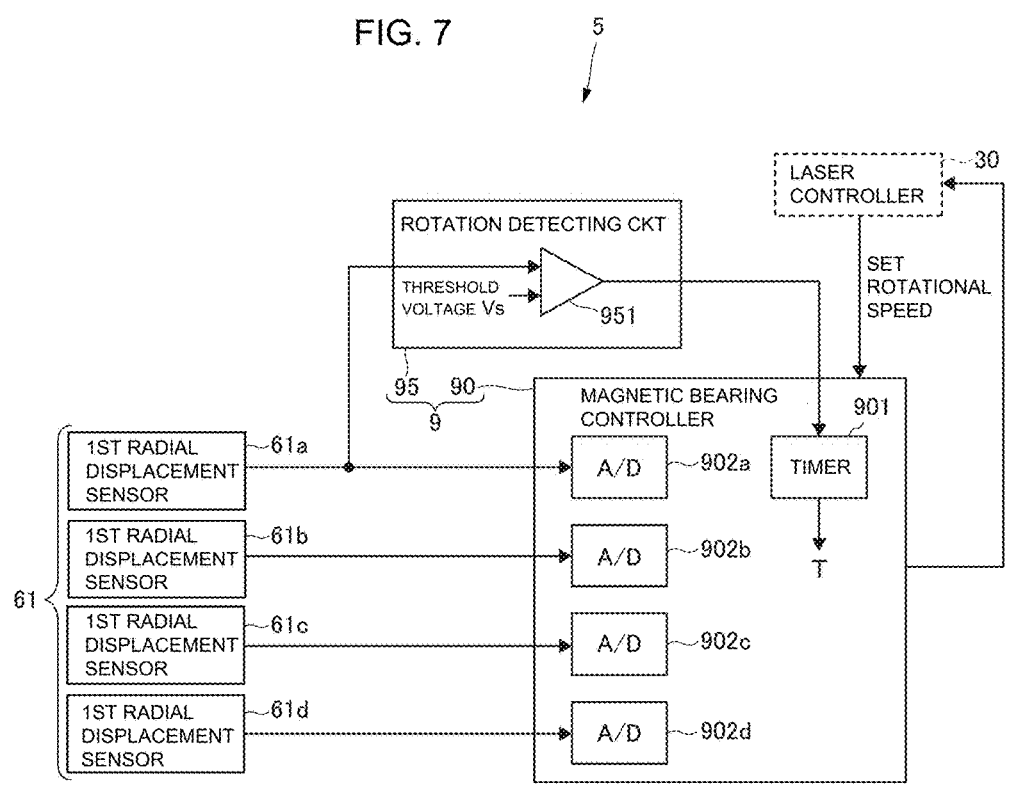
FIG. 7 is a diagram illustrating an example of connection between a comparator, which constitutes a rotation detecting circuit shown in FIG. 5, and a first radial displacement sensor.

Referring to FIG. 6 and FIG. 7, an example of connection between the comparator 951, which constitutes the rotation detecting circuit 95, and the first radial displacement sensor 61 will be described.

FIG. 6 is a sectional view taken along a line A-A shown in FIG. 4.

FIG. 7 is a diagram illustrating an example of connection between the comparator 951, which constitutes the rotation detecting circuit 95 shown in FIG. 5, and the first radial displacement sensor 61.

FIG. 7 merely shows a fragment of the magnetic bearing system 5 shown in FIG. 5 for the sake of illustrating the example of connection between the comparator 951 constituting the rotation detecting circuit 95 and the first radial displacement sensor 61.

The first radial displacement sensor 61 may consist of multiple first radial displacement sensors 61a to 61d, as show in FIG. 6 and FIG. 7.

The multiple first radial displacement sensors 61a to 61d may be spaced at approximately equal intervals in the circumferential direction of the rotary shaft 41. The multiple first radial displacement sensors 61a to 61d may be disposed to face the first sensor target 513 across a can 561.

The AD converter circuit 902 may include multiple AD converter circuits 902a to 902d corresponding to the multiple first radial displacement sensors 61a to 61d, as shown in FIG. 7.

In that case, the input side of the comparator 951 may be connected to a signal line branched from any one of the multiple signal lines connecting the multiple first radial displacement sensors 61a to 61d to the multiple AD converter circuits 902a to 902d, respectively.

FIG. 7 shows an example in which the input side of the comparator 951 is connected to the signal line branched from the signal line connecting the first radial displacement sensor 61a to the AD converter circuit 902a. That is, a detection signal output from the first radial displacement sensor 61a may be input to the comparator 951.

5.2 Operation

Referring to FIG. 6 and FIG. 8 to FIG. 10, the operation of the gas laser apparatus 1 according to the first embodiment will be described. Specifically, the operation of the magnetic bearing system 5 involved in the first embodiment will be described.

The description of the same operational features of the gas laser apparatus 1 of the first embodiment as those of the gas laser apparatus 1 shown in FIG. 1 to FIG. 3 will be omitted.

As described above, the magnetic bearing controller 90 may control the magnetic bearing 50 so as to magnetically levitate the rotary shaft 41.

The magnetic bearing controller 90 may control the magnetic bearing 50 so as to set the position of the magnetically levitated rotary shaft 41 at an appropriate position on the basis of the respective detection signals from the first radial displacement sensor 61, the second radial displacement sensor 62 and the axial displacement sensor 63.

Furthermore, the magnetic bearing controller 90 may control output frequency and output voltage of an inverter 81 to control the speed of revolution and driving torque of a motor 70 such that the fan 40 rotates at a target rotational speed Rt.

For this purpose, the magnetic bearing controller 90 may perform a center-of-inertia control.

Specifically, the magnetic bearing controller 90 may control the magnetic bearing 50 on the basis of the respective detection signals from the first radial displacement sensor 61, the second radial displacement sensor 62 and the axial displacement sensor 63 such that the fan 40 revolves about the center of inertia.

More specifically, the magnetic bearing controller 90 may control a first radial electromagnet 511, a second radial electromagnet 521 and an axial electromagnet 531, which are included in the magnetic bearing 50, on the basis of the detection signals such that the fan 40 rotates about the center of inertia.

The center-of-inertia control is controlling the position of the rotary shaft of the fan 40 such that the magnetically levitated fan 40 revolves about the center of inertia.

The center of inertia of the fan 40 may sometimes differ from the geometric center due to an initial error during the manufacture of the fan 40, aging or particles and the like adhered to the fan 40.

If there is a difference between the center of inertia and the geometric center, the eccentricity can cause the fan 40 to vibrate while being turned about the geometric center.

Meanwhile, if the fan 40 is turned about the center of inertia, the vibration of the fan 40 is suppressed, but respective distances from the first radial displacement sensors 61a to 61d to the first sensor target 513 can periodically change with each rotation of the fan 40.

As a result, the first radial displacement sensors 61a to 61d can output analog detection signals having such intensities that individually periodically vary with the periodically changing distances from the first sensor target 513.

Figure 8:
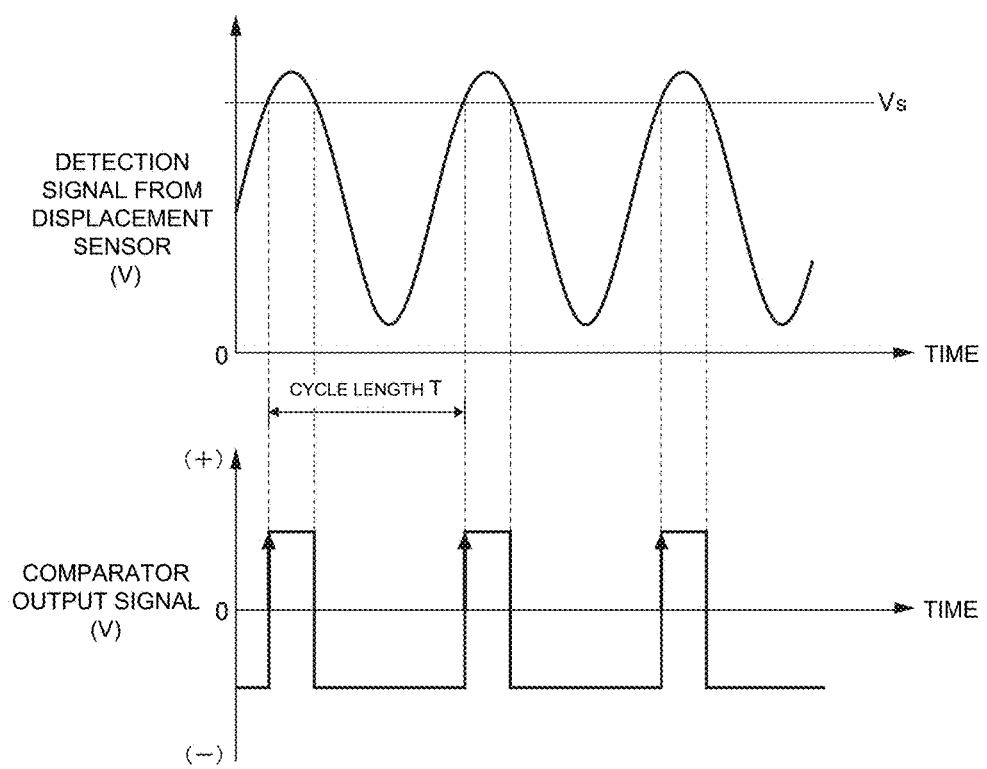
FIG. 8 is a signal chart illustrating a relationship between a detection signal from the first radial displacement sensor and an output signal from the comparator constituting the rotation detecting circuit.

For example, the first radial displacement sensor 61a connected to the comparator 951 of the rotation detecting circuit 95 can output a periodically changing detection signal shown in FIG. 8.

FIG. 8 is a signal chart illustrating a relationship between the detection signal from the first radial displacement sensor 61a and an output signal from the comparator 951 which constitutes the rotation detecting circuit 95.

The comparator 951 constituting the rotation detecting circuit 95 may compare a predetermined threshold voltage Vs with the voltage of the input detection signal from the first radial displacement sensor 61a.

The comparator 951 may output the output signal in the form of a pulse when the voltage of the detection signal exceeds the threshold voltage Vs.

The comparator 951 may output the output signal in such a manner that the output signal rises at a time point when the voltage of the detection signal exceeds the threshold voltage Vs.

The timing of the rising edge of the output signal from the comparator 951 can synchronize with the timing when the voltage of the detection signal from the first radial displacement sensor 61a exceeds the threshold voltage Vs. Thus, the time interval between two successive rising edges of the output signal of the comparator 951 can be approximately equal to the time interval between two successive time points at which the voltage of the detection signal from the first radial displacement sensor 61a exceeds the threshold voltage Vs.

Therefore, the magnetic bearing controller 90 may measure the time interval between two successive time points at which the voltage of the detection signal from the first radial displacement sensor 61a exceeds the threshold voltage Vs by measuring the time interval between two successive rising edges of the output signal from the comparator 951.

Thus, the magnetic bearing controller 90 may measure the cycle length T of the detection signal from the first radial displacement sensor 61a by measuring the cycle length T of the output signal from the comparator 951.

The threshold voltage Vs is not limited to a particular level insofar as it falls within a range that the detection signal from the first radial displacement sensor 61a can take. The threshold voltage Vs may be a mean value between a possible maximum value and a possible minimum value of the detection signal from the first radial displacement sensor 61a. When the threshold voltage Vs is set at the mean value, the rotation detecting circuit 95 can prohibit the threshold voltage Vs from being out of the possible range of the detection signal and thus prevent the problem that the comparator 951 cannot output normal signals.

Figure 9:
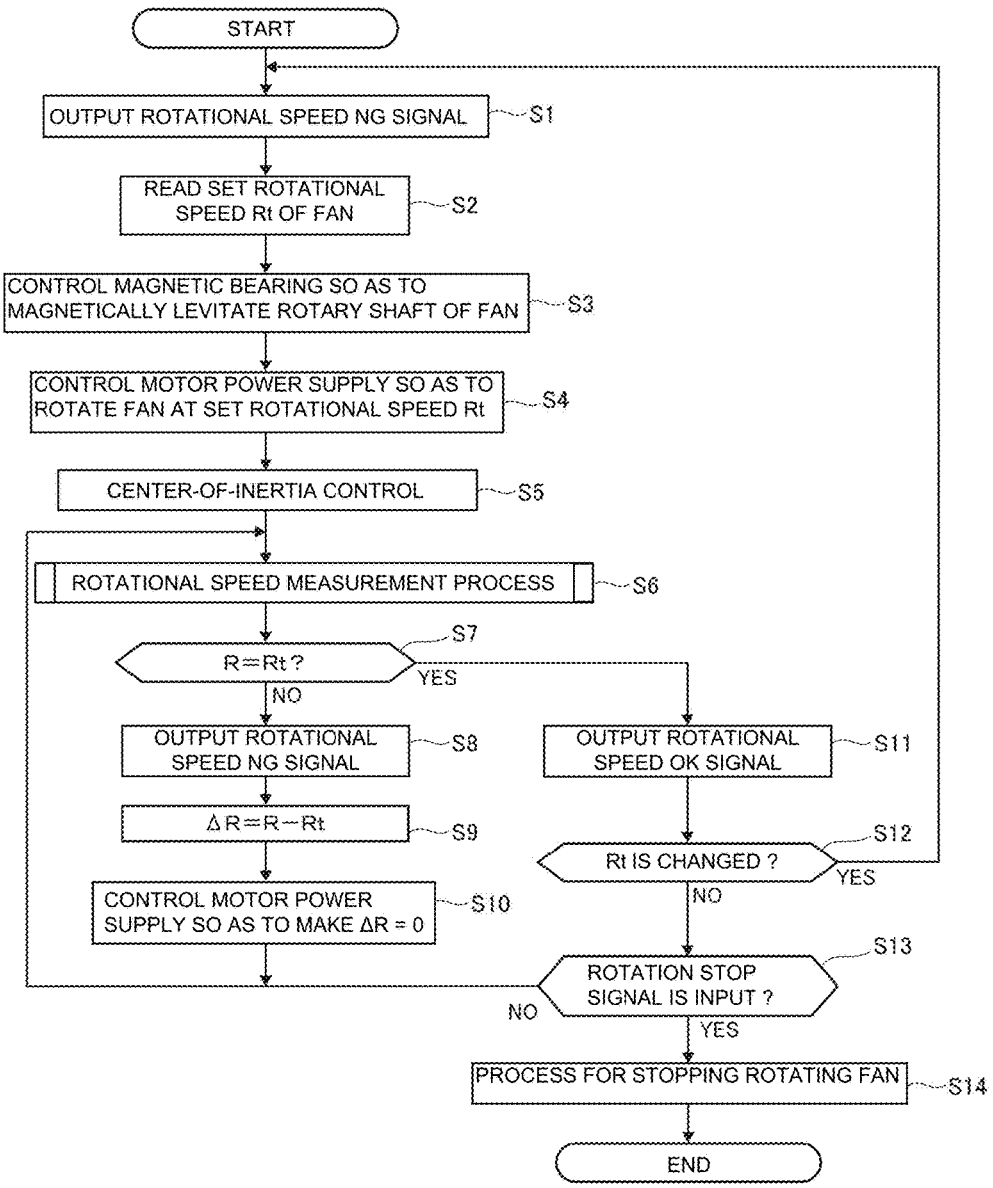
FIG. 9 is a flowchart schematically illustrating a process sequence performed by a magnetic bearing controller involved in the first embodiment.
Figure 10:
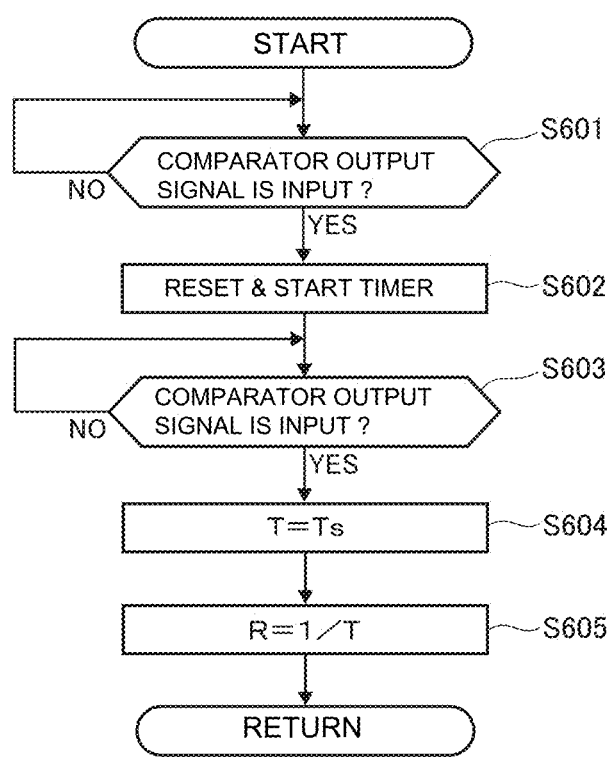
FIG. 10 is a flowchart illustrating a rotational speed measurement process in step S6 of FIG. 9.

Referring to FIG. 9 and FIG. 10, the processes performed by the magnetic bearing controller 90 of the magnetic bearing system 5 involved in the first embodiment will be described in detail.

FIG. 9 is a flowchart schematically illustrating the processes performed by the magnetic bearing controller 90 involved in the first embodiment.

In step S1, the magnetic bearing controller 90 may output a rotational speed NG signal to a laser controller 30.

The rotational speed NG signal may be a signal informing the laser controller 30 that the rotational speed of the fan 40 does not reach the target rotational speed Rt.

The laser controller 30 may output a signal designating the target rotational speed Rt of the fan 40 to the magnetic bearing controller 90.

In step S2, the magnetic bearing controller 90 may read the target rotational speed Rt of the fan 40, designated by the laser controller 30.

In step S3, the magnetic bearing controller 90 may control the magnetic bearing 50 so as to magnetically levitate the rotary shaft 41 of the fan 40.

Specifically, the magnetic bearing controller 90 may drive the first radial electromagnet 511, the second radial electromagnet 521 and the axial electromagnet 531 to magnetically levitate the rotary shaft 41 of the fan 40.

The magnetic bearing controller 90 may be fed with the respective detection signals from the first radial displacement sensor 61, the second radial displacement sensor 62 and the axial displacement sensor 63.

The magnetic bearing controller 90 may control the first radial electromagnet 511, the second radial electromagnet 521 and the axial electromagnet 531 on the basis of the respective detection signals, so as to set the position of the magnetically levitated rotary shaft 41 at a desired position.

In step S4, the magnetic bearing controller 90 may control a motor power supply 80 so as the fan 40 to rotate at the target rotational speed Rt.

Specifically, the magnetic bearing controller 90 may set up an inverter 81 with initial values for output frequency and output voltage of the inverter 81, which correspond to the target rotational speed Rt.

The inverter 81 can drive the motor 70 at the initial values of the output frequency and output voltage. The speed of revolution and driving torque of the motor 70 can be controlled according to the output frequency and output voltage of the inverter 81. As a result, it is possible to control the rotational speed of the fan 40 and the voltage applied to the motor 70 so as the fan 40 to rotate at the target rotational speed Rt.

In step S5, the magnetic bearing controller 90 may execute a center-of-inertia control.

Specifically, the magnetic bearing controller 90 may control the first radial electromagnet 511, the second radial electromagnet 521 and the axial electromagnet 531, which are included in the magnetic bearing 50, such that the fan 40 revolves about the center of inertia.

In step S6, the magnetic bearing controller 90 may perform a rotational speed measurement process for measuring the rotational speed of the fan 40.

The detail of the rotational speed measurement process will be described later using FIG. 10.

In step S7, the magnetic bearing controller 90 may determine whether a measured value R of the rotational speed of the fan 40 coincides with the target rotational speed Rt.

When the measured value R coincides with the target rotational speed Rt, the magnetic bearing controller 90 may proceed to step S11. Meanwhile, when the measured value R does not coincide with the target rotational speed Rt, the magnetic bearing controller 90 may proceed to step S8.

In step S8, the magnetic bearing controller 90 may output the rotational speed NG signal to the laser controller 30.

In step S9, the magnetic bearing controller 90 may calculate the difference ΔR between the measured value R and the target rotational speed Rt of the rotational speed of the fan 40. The magnetic bearing controller 90 may calculate the difference ΔR according to the following equation:

$$\Delta R = R - Rt$$

In step S10, the magnetic bearing controller 90 may control the motor power supply 80 so as the difference ΔR to be 0.

Specifically, the magnetic bearing controller 90 may set up the inverter 81 with those initial values for output frequency and output voltage of the inverter 81, which correspond to the difference ΔR.

The inverter 81 can drive the motor 70 at an output frequency and an output voltage, corresponding to the difference ΔR. The speed of revolution and driving torque of the motor 70 can be controlled according to the output frequency and the output voltage of the inverter 81. As a result, the rotational speed of the fan 40 and the power supplied to the motor 70 can be controlled so as to reduce the difference ΔR to 0.

After step S10, the magnetic bearing controller 90 may proceed to step S6.

In step S11, the magnetic bearing controller 90 may output a rotational speed OK signal to the laser controller 30.

The rotational speed OK signal may be a signal informing the laser controller 30 that the rotational speed of the fan 40 reaches the target rotational speed Rt.

In step S12, the magnetic bearing controller 90 may determine whether the target rotational speed Rt is changed or not.

The laser controller 30 may change the target rotational speed Rt of the fan 40. In that case, the laser controller 30 may output a signal designating the changed target rotational speed Rt to the magnetic bearing controller 90.

Upon the target rotational speed Rt being changed, the magnetic bearing controller 90 may proceed to step S1. Meanwhile, unless the target rotational speed Rt is changed, the magnetic bearing controller 90 may proceed to step S13.

In step S13, the magnetic bearing controller 90 may determine whether or not a signal instructing to stop rotating the fan 40 is fed from the laser controller 30 to the magnetic bearing controller 90.

If no instruction to stop rotating the fan 40 is received, the magnetic bearing controller 90 may proceed to step S6. Meanwhile, upon receipt of an instruction to stop rotating the fan 40, the magnetic bearing controller 90 may proceed to step S14.

In step S14, the magnetic bearing controller 90 may execute a process for stopping rotating the fan 40.

Specifically, the magnetic bearing controller 90 may stop the motor power supply 80 and thus stop the revolution of the fan 40. Thereafter, the magnetic bearing controller 90 may terminate the process sequence shown in FIG. 9.

FIG. 10 is a flowchart illustrating the rotational speed measurement process in step S6 of FIG. 9.

In step S601, the magnetic bearing controller 90 may determine whether or not an output signal from the comparator 951, which constitutes the rotation detecting circuit 95, is input to the magnetic bearing controller 90.

The magnetic bearing controller 90 may determine a rising edge in the output signal from the comparator 951 as an input of the comparator output signal which can be regarded as an output signal from the rotation detecting circuit 95.

If no input of the output signal from the comparator 951 is detected, the magnetic bearing controller 90 may standby for the input. Meanwhile, upon detecting an input of the output signal from the comparator 951, the magnetic bearing controller 90 may proceed to step S602.

In step S602, the magnetic bearing controller 90 may reset and start the timer 901.

The magnetic bearing controller 90 may reset and start the timer 901 in synchronism with the rising edge in the output signal of the comparator 951, being input to the magnetic bearing controller 90.

In step S603, the magnetic bearing controller 90 may determine whether or not there is an input of the output signal from the comparator 951.

The magnetic bearing controller 90 may determine that there is an input of the output signal, upon a rising edge in the output signal of the comparator 951 being detected again.

If there is no input of the output signal from the comparator 951, the magnetic bearing controller 90 may standby for the input. Meanwhile, the magnetic bearing controller 90 may proceed to step S604 upon input of the output signal from the comparator 951.

In step S604, the magnetic bearing controller 90 may read the count Ts of the timer 901, which may be regarded as the cycle length T.

The count Ts can indicate the time interval between two successive rising edges in the output signal from the comparator 951, the edges being measured in steps S601 and S603. That is, the count Ts can indicate the cycle length T of the output signal from the comparator 951 and the cycle length T of the detection signal from the first radial displacement sensor 61a as well.

The magnetic bearing controller 90 may also calculate the cycle length T according to the following equation:

$$T=Ts$$

In step S605, the magnetic bearing controller 90 may calculate the reciprocal of the cycle length T and decide the calculated value as the measured value R of the rotational speed of the fan 40.

The magnetic bearing controller 90 may calculate the measured value R of the rotational speed of the fan 40 according to the following equation:

$$R=1/T$$

Thereafter, the magnetic bearing controller 90 may terminate the process in step S6 and proceed to step S7 of FIG. 9.

Other features of the magnetic bearing system 5 involved in the first embodiment may be the same as those of the magnetic bearing system 5 shown in FIG. 1 to FIG. 3.

Thus, on the basis of the output signal of the comparator 951, the magnetic bearing controller 90 can measure a plurality of time points at which the voltage of the detection signal from the first radial displacement sensor 61a exceeds the threshold voltage Vs, to determine the cycle length T of the detection signal by the time interval between the time points. Then, by calculating the reciprocal of the determined cycle length T, the magnetic bearing controller 90 can measure the rotational speed of the fan 40.

5.3 Effect

The magnetic bearing controller 90 involved in the first embodiment can measure the rotational speed of the fan 40 by rotating the fan 40 according to the center-of-inertia control and making use of the periodical change in distance between the first radial displacement sensors 61 and the first sensor target 513 with each rotation of the fan 40.

Therefore, the magnetic bearing system 5 involved in the first embodiment can measure the rotational speed of the fan 40 properly without the rotation detector section 540 which is provided in the magnetic bearing system 5 shown in FIG. 1 to FIG. 3.

Accordingly, the magnetic bearing system 5 involved in the first embodiment can omit the rotation detector section 540, simplifying the device configuration and lowering the cost.

As a result, the gas laser apparatus 1 of the first embodiment can save the cost.

Incidentally, the magnetic bearing controller 90 involved in the first embodiment may measure the rotational speed of the fan 40 on the basis of a detection signal from any of the second to fourth radial displacement sensors 61b to 61d instead of the detection signal from the first radial displacement sensor 61a. In addition, the magnetic bearing controller 90 involved in the first embodiment may measure the rotational speed of the fan 40 on the basis of a detection signal from the second radial displacement sensor 62 not of that from the first radial displacement sensor 61.

5.4 Modification 1 of First Embodiment

Figure 11:
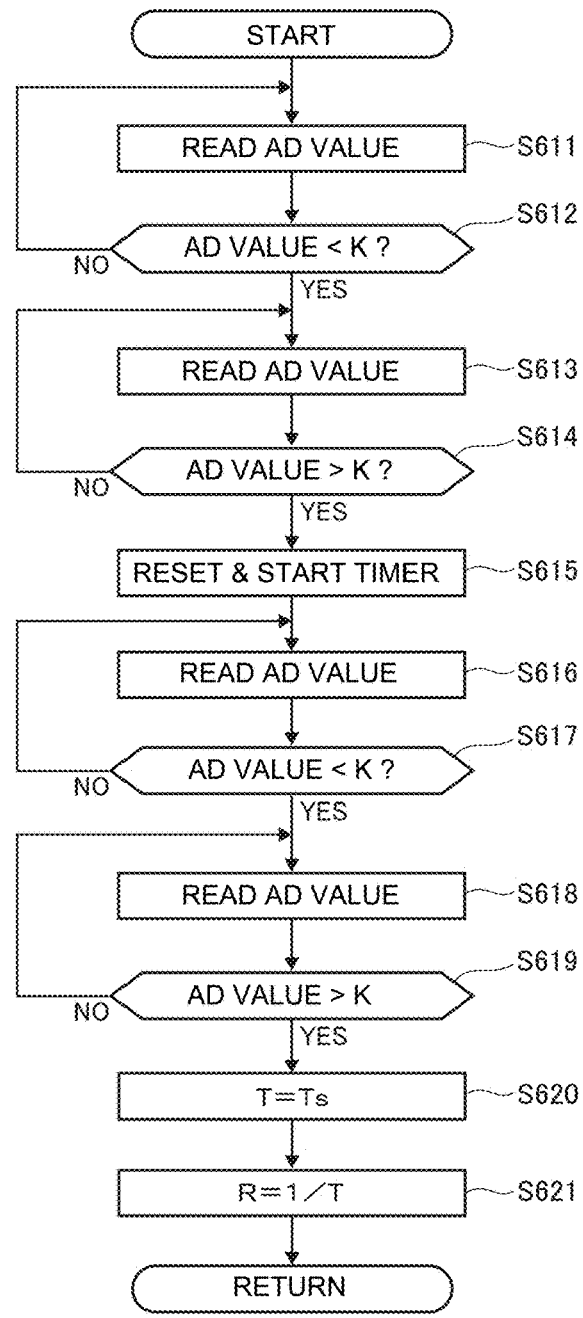
FIG. 11 is a flowchart illustrating a rotational speed measurement process performed by a magnetic bearing controller involved in modification 1 of the first embodiment.

Referring to FIG. 11, a magnetic bearing system 5 provided in a gas laser apparatus 1 according to modification 1 of the first embodiment will be described.

In the magnetic bearing system 5 involved in modification 1 of the first embodiment, the function of the rotation detecting circuit 95 may be configured as a software function.

Namely, in the magnetic bearing system 5 involved in modification 1 of the first embodiment, a magnetic bearing controller 90 may include the capability of measuring the rotational speed of the fan 40 on the basis of a detection signal from the first or the second radial displacement sensor 61 or 62. Then, the magnetic bearing system 5 involved in modification 1 of the first embodiment does not need to include the rotation detecting circuit 95.

With respect to the gas laser apparatus 1 according to modification 1 of the first embodiment, the description of similar features to those of the gas laser apparatus 1 of the first embodiment will be omitted.

FIG. 11 is a flowchart illustrating a rotational speed measurement process carried out by the magnetic bearing controller 90 involved in modification 1 of the first embodiment.

The magnetic bearing controller 90 involved in modification 1 of the first embodiment may carry out the rotational speed measurement process shown in FIG. 11 in step S6 of FIG. 9, alternatively to the rotational speed measurement process shown in FIG. 10.

In step S611, the magnetic bearing controller 90 may read an AD value from an AD converter circuit 902a.

The AD value may be a digital value converted by the AD converter circuit 902a from an analog detection signal output from a first radial displacement sensor 61a.

Namely, the magnetic bearing controller 90 may read the digital value of the detection signal from the first radial displacement sensor 61a.

In step S612, the magnetic bearing controller 90 may determine whether or not the read AD value is smaller than a threshold value K.

The threshold value K may be a digital value corresponding to the threshold voltage Vs. The threshold value K may be a mean value between a possible maximum value and a possible minimum value of the detection signal from the first radial displacement sensor 61a.

The magnetic bearing controller 90 may proceed to step S611 when the AD value is not smaller than the threshold value K. Meanwhile, the magnetic bearing controller 90 may proceeds to step S613 when the AD value is smaller than the threshold value K.

In step S613, the magnetic bearing controller 90 may read the AD value of the AD converter circuit 902a again.

In step S614, the magnetic bearing controller 90 may determine whether or not the read AD value is greater than the threshold value K.

The magnetic bearing controller 90 may proceed to step S613 when the AD value is not greater than the threshold value K. Meanwhile, the magnetic bearing controller 90 may proceed to step S615 when the AD value is greater than the threshold value K.

In step S615, the magnetic bearing controller 90 may reset and start the timer 901.

As shown in FIG. 8, the detection signal from the first radial displacement sensor 61a can change periodically. A time point at which the AD value changes from a value smaller than the threshold value K to a value greater than the threshold value K can correspond to the time when the voltage of the detection signal from the first radial displacement sensor 61a exceeds the threshold voltage Vs. Namely, the time point at which the AD value changes from a value smaller than the threshold value K to a value greater than the threshold value K can correspond to a time point shown in FIG. 8, at which a rising edge in the output signal of the comparator 951 is detected.

In step S616, the magnetic bearing controller 90 may read the AD value of the AD converter circuit 902a.

In step S617, the magnetic bearing controller 90 may determine whether or not the read AD value is smaller than the threshold value K.

The magnetic bearing controller 90 may proceed to step S616 when the AD value is not less than the threshold value K. Meanwhile, the magnetic bearing controller 90 may proceed to step S618 when the AD value is less than the threshold value K.

In step S618, the magnetic bearing controller 90 may read the AD value of the AD converter circuit 902a again.

In step S619, the magnetic bearing controller 90 may determine whether or not the read AD value is greater than the threshold value K.

The magnetic bearing controller 90 may proceed to step S618 when the AD value is not greater than the threshold value K. Meanwhile, the magnetic bearing controller 90 may proceed to step S620 when the AD value is greater than the threshold value K.

In step S620, the magnetic bearing controller 90 may read the count Ts of the timer 901 and apply the count Ts of the timer 901 as the cycle length T.

As described above, a time point at which the AD value changes from a value smaller than the threshold value K to a value greater than the threshold value K can correspond to a moment when the voltage of the detection signal from the first radial displacement sensor 61a exceeds the threshold voltage Vs.

The count Ts can indicate a time interval between two successive time points at which the AD value having been smaller than the threshold value K changes to a value greater than the threshold value K. The count Ts can indicate the cycle length T of the detection signal from the first radial displacement sensor 61a.

The magnetic bearing controller 90 may calculate the cycle length T according to the following equation:

$$T = Ts$$

In step S621, the magnetic bearing controller 90 may calculate the reciprocal of the cycle length T to decide the calculated value as the measured value R of the rotational speed of the fan 40.

The magnetic bearing controller 90 may calculate the measured value R of the rotational speed of the fan 40 according to the following equation:

$$R = 1/T$$

Thereafter, the magnetic bearing controller 90 may terminate the rotational speed measurement process of FIG. 11 and proceed to step S7 in FIG. 9.

Other features of the magnetic bearing system 5 involved in modification 1 of the first embodiment may be the same as those of the magnetic bearing system 5 involved in the first embodiment.

Thus, the magnetic bearing controller 90 involved in modification 1 of the first embodiment can measure multiple time points at which the AD value of the detection signal from the first radial displacement sensor 61a exceeds the threshold value K, to determine the cycle length T of the detection signal by the time interval between the time points. Then, the magnetic bearing controller 90 can measure the rotational speed of the fan 40 by calculating the reciprocal of the determined cycle length T.

Namely, the magnetic bearing system 5 involved in modification 1 of the first embodiment can measure the rotational speed of the fan 40 properly without the rotation detecting circuit 95.

Thereby, the magnetic bearing system 5 involved in modification 1 of the first embodiment can still more simplify the device configuration and lower the cost.

As a result, the gas laser apparatus 1 in modification 1 of the first embodiment can further save the cost.

5.5 Modification 2 of First Embodiment

Figure 12:
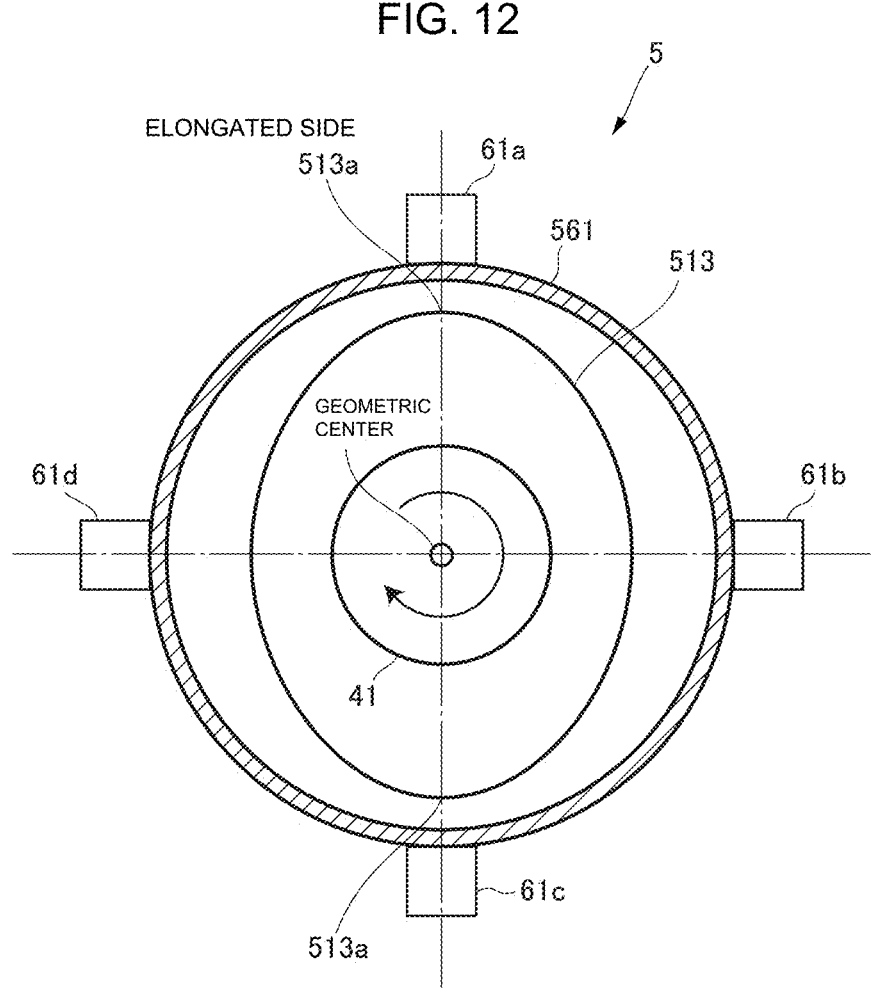
FIG. 12 is a sectional view, taken along a line A-A shown in FIG. 4, of a magnetic bearing system involved in modification 2 of the first embodiment.
Figure 13:
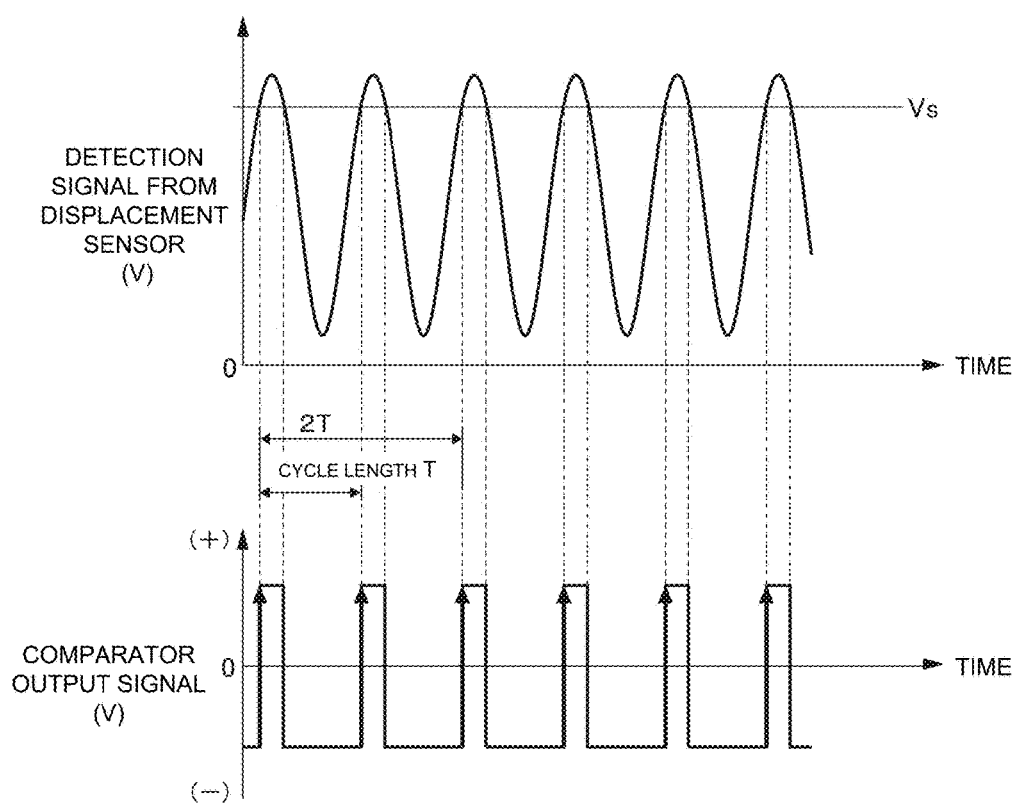
FIG. 13 is a signal chart illustrating a relationship between a detection signal from a first radial displacement sensor involved in modification 2 of the first embodiment and an output signal from the comparator constituting the rotation detecting circuit.
Figure 14:
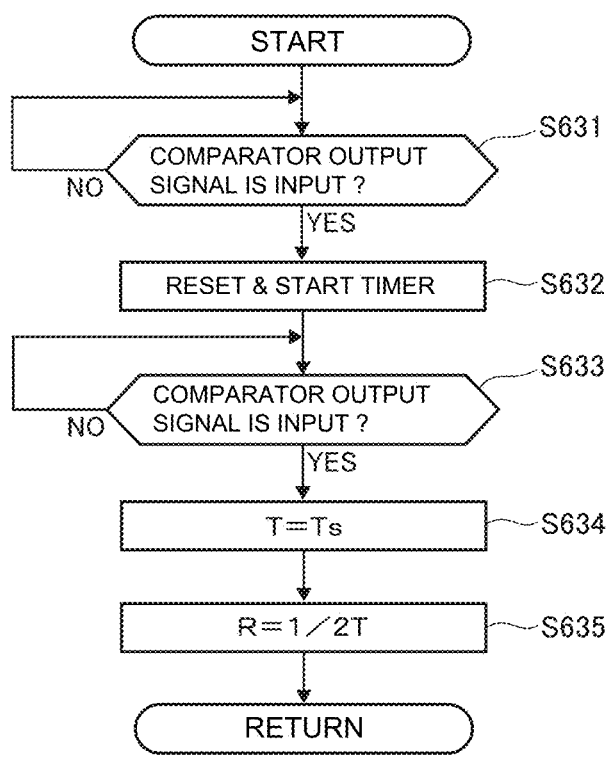
FIG. 14 is a flowchart illustrating a rotational speed measurement process performed by a magnetic bearing controller involved in modification 2 of the first embodiment.

Referring to FIG. 12 to FIG. 14, a magnetic bearing system 5 provided in a gas laser apparatus 1 according to modification 2 of the first embodiment will be described.

The magnetic bearing system 5 involved in modification 2 of the first embodiment may rotate a fan 40 about the geometric center, not about the center of inertia.

In modification 2 of the first embodiment, the description about similar features of the gas laser apparatus 1 to those described with respect to the gas laser apparatus 1 of the first embodiment will be omitted.

FIG. 12 is a sectional view, taken along a line A-A shown in FIG. 4, of a magnetic bearing system involved in modification 2 of the first embodiment. FIG. 13 is a signal chart illustrating a relationship between a detection signal from a first radial displacement sensor 61a and an output signal from a comparator 951 constituting a rotation detecting circuit 95.

A first sensor target 513 involved in modification 2 of the first embodiment may be formed to be substantially oval in the section viewed from the axial direction.

According to this configuration, the rim portions on the elongated sides 513a of the first sensor target 513 can come closer to and then go away from each of first radial displacement sensors 61a to 61d in a cycle corresponding to half revolution of the fan 40 as rotating about the geometric center.

As a result, while the fan 40 is rotating about the geometric center, the distance in the radial direction of the rotary shaft 41 between the first sensor target 513 and each of the first radial displacement sensors 61a to 61d can change periodically in cycles corresponding to half revolution of the fan 40.

Thus, the first radial displacement sensors 61a to 61d can each output an analog detection signal with such intensity that changes periodically according to the periodically changing distance to the first sensor target 513.

For example, the first radial displacement sensor 61a can output a periodically changing detection signal as shown in FIG. 13.

Therefore, the magnetic bearing controller 90 involved in modification 2 of the first embodiment can measure a cycle length T of the output signal of the comparator 951, as well as the magnetic bearing controller 90 involved in the first embodiment. The cycle length T of the output signal of the comparator 951 can correspond to the cycle length T of the detection signal from the first radial displacement sensor 61a.

In this case, however, the cycle length T can correspond to the time taken by the fan 40 to make a half revolution. The time for one revolution of the fan 40 can correspond to twice the cycle length T.

FIG. 14 is a flowchart illustrating a rotational speed measurement process performed by a magnetic bearing controller 90 involved in modification 2 of the first embodiment.

The magnetic bearing controller 90 involved in modification 2 of the first embodiment may perform a rotational speed measurement process shown in FIG. 14 in step S6 of FIG. 9, as an alternative to the rotational speed measurement process shown in FIG. 10.

In steps S631 to S634, the magnetic bearing controller 90 may perform the same processes as shown in steps S601 to S604 shown in FIG. 10.

In step S635, the magnetic bearing controller 90 may calculate the rotational speed of the fan 40 from the cycle length T.

As described above, since the cycle length T corresponds to the time for half revolution of the fan 40, the time for one revolution of the fan 40 can correspond to twice the cycle length T.

The magnetic bearing controller 90 may calculate the measured value R of the rotational speed of the fan 40 according to the following equation:

$$R = 1/2T$$

Thereafter, the magnetic bearing controller 90 may terminate the rotational speed measurement process of FIG. 14 and proceed to step S7 in FIG. 9.

Other features of the magnetic bearing system 5 involved in modification 2 of the first embodiment may be similar to those of the magnetic bearing system 5 involved in the first embodiment.

Thus, forming the first sensor target 513 to have a substantially oval shape makes it possible for the magnetic bearing controller 90 involved in modification 2 of the first embodiment to determine the cycle length T of the detection signal from the first radial displacement sensor 61a even while the fan 40 is rotated about the geometric center not about the center of inertia. Then, the magnetic bearing controller 90 may measure the rotational speed of the fan 40 by calculating the reciprocal of the value 2T that is twice the determined cycle length T.

Accordingly, the magnetic bearing system 5 involved in modification 2 of the first embodiment can measure the rotational speed of the fan 40 properly even while the fan 40 is rotated about the geometric center.

Thus, the magnetic bearing system 5 involved in modification 2 of the first embodiment can simplify the device configuration and reduce the cost even while the fan 40 is rotated about the geometric center.

As a result, the gas laser apparatus 1 according to modification 2 of the first embodiment can save the cost.

Incidentally, the first sensor target 513 involved in modification 2 of the first embodiment may be formed to have another contour in section viewed from the axial direction; the contour may not substantially be oval but polygonal with "n" sides. Corners of a polygonal first sensor target 513 may be round-chamfered.

In this configuration, the magnetic bearing controller 90 may measure the rotational speed of the fan 40 by calculating a reciprocal of a value nT that is "n" times the cycle length T of the detection signal from the first radial displacement sensor 61a.

Furthermore, the rotation detecting circuit 95 may be configured as a software function in the magnetic bearing controller 90 involved in modification 2 of the first embodiment, like in the magnetic bearing controller 90 involved in modification 1 of the first embodiment.

The magnetic bearing controller 90 involved in modification 2 of the first embodiment may rotate the fan 40 about the center of inertia not about the geometric center, like the magnetic bearing controller 90 involved in the first embodiment. Also in this case, the rotational speed of the fan 40 can be measured in the same way as in the case where the fan 40 is rotated about the geometric center.

6. Magnetic Bearing System in Gas Laser Apparatus of Second Embodiment

Figure 15:
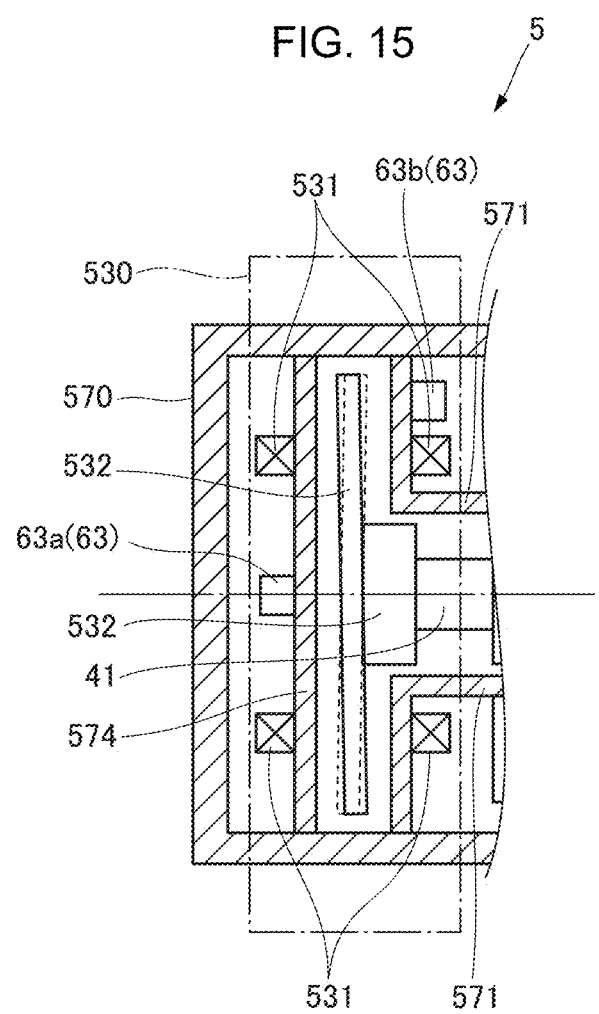
FIG. 15 is a diagram illustrating a configuration of a magnetic bearing system involved in a second embodiment.
Figure 16:
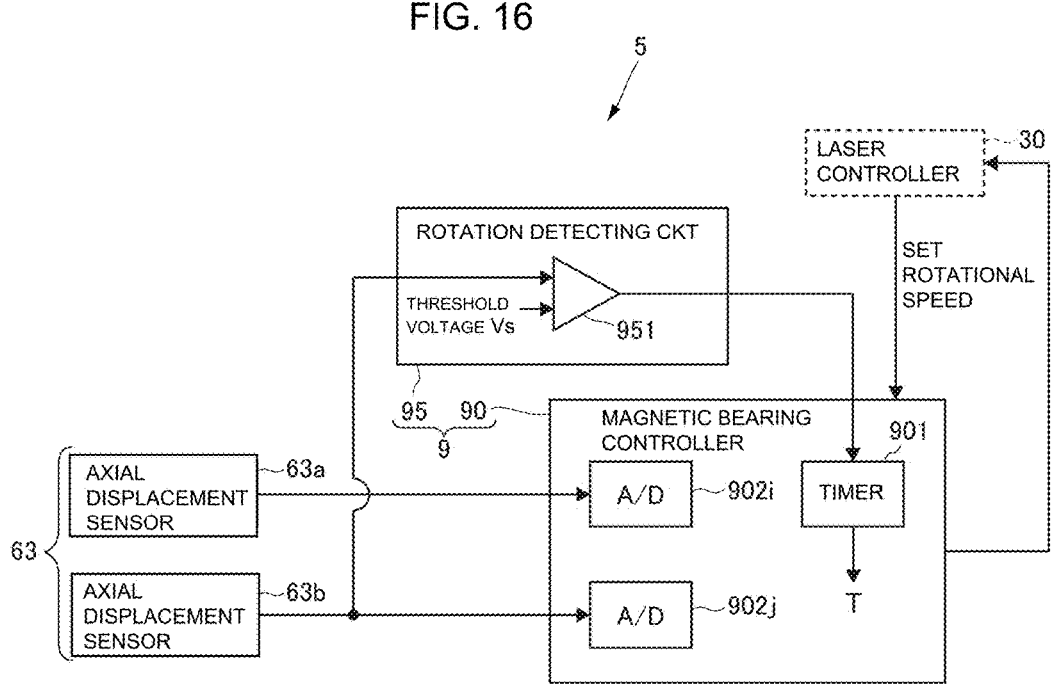
FIG. 16 is a diagram illustrating an electric configuration of the magnetic bearing system involved in the second embodiment.
Figure 17:
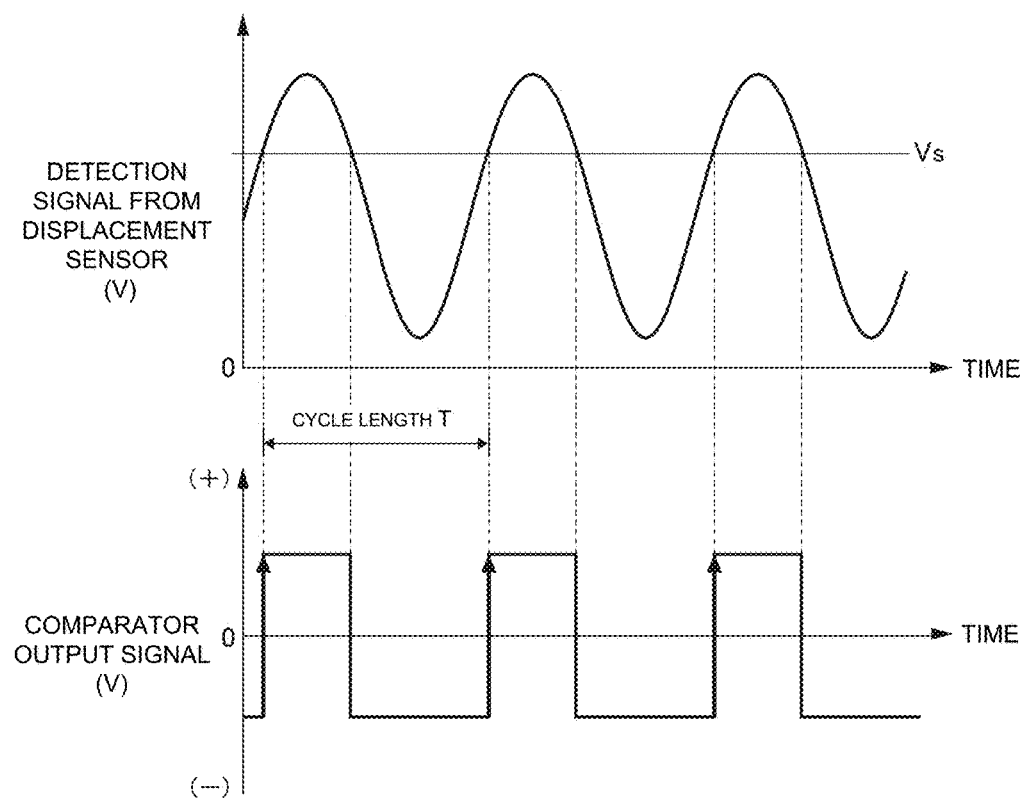
FIG. 17 is a signal chart illustrating a relationship between a detection signal from an axial displacement sensor involved in the second embodiment and an output signal from a comparator constituting a rotation detecting circuit.

Referring to FIG. 15 to FIG. 17, a magnetic bearing system 5 provided in a gas laser apparatus 1 according to the second embodiment will be described.

The magnetic bearing system 5 involved in the second embodiment may measure the rotational speed of the fan 40 on the basis of a detection signal from axial displacement sensor 63 not of that from the first or the second radial displacement sensor 61 or 62.

In the gas laser apparatus 1 of the second embodiment, the description about similar features to those described with respect to the gas laser apparatus 1 of the first embodiment will be omitted.

FIG. 15 is a diagram illustrating a configuration of the magnetic bearing system 5 involved in the second embodiment.

The axial displacement sensor 63 involved in the second embodiment may consist of multiple axial displacement sensors 63a and 63b.

Like the axial displacement sensor 63 in the first embodiment shown in FIG. 4, the axial displacement sensor 63a may be disposed outside a can 574 in a casing 570.

The axial displacement sensor 63a may be disposed to face a disk 532 fixed on the rotary shaft 41 at about the center of the disk 532. The axial displacement sensor 63a may be located substantially on the extension line from the rotary shaft 41 at a position across the can 574.

The axial displacement sensor 63b may be disposed outside a can 571 in the casing 570.

The axial displacement sensor 63b may be disposed to face the disk 532 fixed on the rotary shaft 41 in a peripheral portion of the disk 532. The axial displacement sensor 63b may be located apart from the extension line from the rotary shaft 41, at a position across the can 571.

FIG. 16 is a diagram illustrating an electric configuration of the magnetic bearing system 5 involved in the second embodiment. FIG. 17 is a signal chart illustrating a relationship between a detection signal from the axial displacement sensor 63b and an output signal from a comparator 951 constituting a rotation detecting circuit 95.

FIG. 16 merely shows a fragment of the electric configuration of the magnetic bearing system 5 involved in the second embodiment for the sake of illustrating an example of connection between the comparator 951 included in the rotation detecting circuit 95 and the axial displacement sensors 63. The fundamental electric configuration of the magnetic bearing system 5 may be as shown in FIG. 5.

The second embodiment may include multiple AD converter circuits 902i and 902j corresponding to the multiple axial displacement sensors 63a and 63b.

The rotation detecting circuit 95 involved in the second embodiment may detect the rotational movement of a fan 40 on the basis of a detection signal output from the axial displacement sensors 63.

An input of the comparator 951 constituting the rotation detecting circuit 95 may be connected to a signal line branched from a signal line connecting the axial displacement sensor 63b to the AD converter circuit 902j.

The output of the comparator 951 constituting the rotation detecting circuit 95 may be electrically connected to a timer 901.

The comparator 951 may be fed with the detection signal from the axial displacement sensor 63b.

Here, it is likely that the rotary shaft 41 of the fan 40 is not formed completely straight. It is also likely that the disk 532 is not formed completely perpendicular to the rotary shaft 41.

As a result, the disk 532 fixed on the rotary shaft 41 can often turn in a position slightly inclined to a perpendicular plane to the center line of the rotary shaft 41, as shown in FIG. 15.

In that case, the peripheral portion of the disk 532 can come closer to and then go away from the axial displacement sensor 63b each time the fan 40 makes a revolution.

Therefore, regardless of whether the fan 40 is rotated about the center of inertia or the geometric center, the distance from the axial displacement sensor 63b to the disk 532 can change periodically with each rotation of the fan 40.

As a result, the axial displacement sensor 63b can output a detection signal of which the intensity changes periodically along with the periodically changing distance to the disk 532.

For example, the axial displacement sensor 63b can output a periodically changing detection signal as shown in FIG. 17.

The magnetic bearing controller 90 may measure the time interval between two successive time points at which the voltage of the detection signal from the axial displacement sensor 63b exceeds a threshold voltage Vs by measuring the time interval between two successive rising edges of the output signal from the comparator 951.

Thereby, the magnetic bearing controller 90 may measure the cycle length T of the output signal of the comparator 951 and measure the cycle length T of the detection signal from the axial displacement sensor 63b.

Other features of the magnetic bearing system 5 involved in the second embodiment may be the same as those described with respect to the magnetic bearing system 5 involved in the first embodiment.

As described above, the magnetic bearing controller 90 involved in the second embodiment can measure multiple time points at which the voltage of the detection signal from the axial displacement sensor 63b exceeds the threshold voltage Vs, and determine the cycle length T of the detection signal by the time interval between the multiple time points. Then, the magnetic bearing controller 90 may measure the rotational speed of the fan 40 by calculating the reciprocal of the determined cycle length T.

Therefore, like the magnetic bearing system 5 involved in the first embodiment, the magnetic bearing system 5 involved in the second embodiment can measure the rotational speed of the fan 40 properly without the rotation detector section 540 shown in FIG. 1 to FIG. 3.

Accordingly, the magnetic bearing system 5 involved in the second embodiment can eliminate the rotation detector section 540, thereby simplifying the device configuration and reducing the cost.

As a result, the gas laser apparatus 1 of the second embodiment can save the cost.

Note that the disk 532 involved in the second embodiment may be intentionally configured to incline to the perpendicular plane to the center line of the rotary shaft 41.

Furthermore, in the magnetic bearing controller 90 involved in the second embodiment, the rotation detecting circuit 95 may be configured as a software function, like the magnetic bearing controller 90 involved in modification 1 of the first embodiment.

The magnetic bearing controller 90 involved in the second embodiment may as well rotate the fan 40 about the center of inertia or the geometric center.

7. Magnetic Bearing System in Gas Laser Apparatus of Third Embodiment

Referring to FIG. 18 to FIG. 21, a magnetic bearing system 5 provided in a gas laser apparatus 1 according to a third embodiment will be described.

The magnetic bearing system 5 involved in the third embodiment may measure the rotational speed of the fan 40 on the basis of any of the respective detection signals from a first radial displacement sensor 61, a second radial displacement sensor 62 and an axial displacement sensor 63.

Furthermore, in the magnetic bearing system 5 involved in the third embodiment, a rotation detecting circuit 95 may be configured as a software function.

In the gas laser apparatus 1 of the third embodiment, the description of similar features to those described with respect to the gas laser apparatuses 1 of the first and second embodiments will be omitted.

Figure 18:
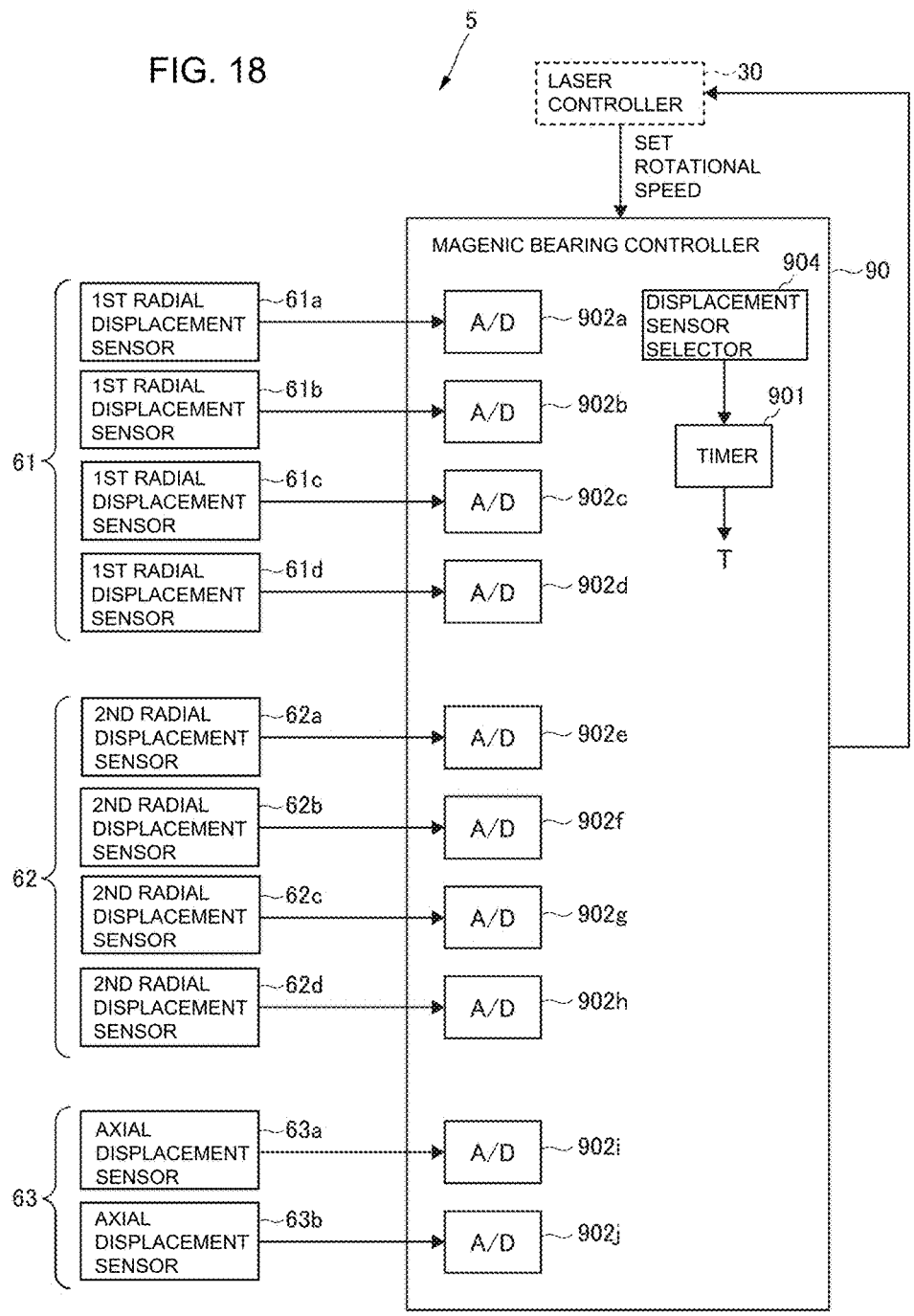
FIG. 18 is a diagram illustrating an electric configuration of a magnetic bearing system involved in a third embodiment.

FIG. 18 is a diagram illustrating an electric configuration of the magnetic bearing system 5 involved in the third embodiment.

FIG. 18 merely shows a fragment of the electric configuration of the magnetic bearing system 5 involved in the third embodiment for the sake of illustrating a configuration consisting of first radial displacement sensors 61, second radial displacement sensors 62 and axial displacement sensors 63 and a magnetic bearing controller 90. The fundamental electric configuration of the magnetic bearing system 5 may be as shown in FIG. 5.

The first radial displacement sensors 61 involved in the third embodiment may consist of multiple first radial displacement sensors 61a to 61d.

The second radial displacement sensors 62 involved in the third embodiment may consist of multiple second radial displacement sensors 62a to 62d.

The axial displacement sensors 63 involved in the third embodiment may consist of multiple axial displacement sensors 63a and 63b.

AD converter circuits 902 involved in the third embodiment may include multiple AD converter circuits 902a to 902d corresponding to the multiple first radial displacement sensors 61a to 61d.

The AD converter circuits 902 may include multiple AD converter circuits 902e to 902h corresponding to the multiple second radial displacement sensors 62a to 62d.

The AD converter circuits 902 may include multiple AD converter circuits 902i and 902j corresponding to the multiple axial displacement sensor 63a and 63b.

The magnetic bearing controller 90 involved in the third embodiment may include a displacement sensor selector 904.

The displacement sensor selector 904 may be configured as a software device of selecting one displacement sensor 60 for measurement of the rotational speed of a fan 40 from among the displacement sensors 60 included in the magnetic bearing system 5.

Figure 19:
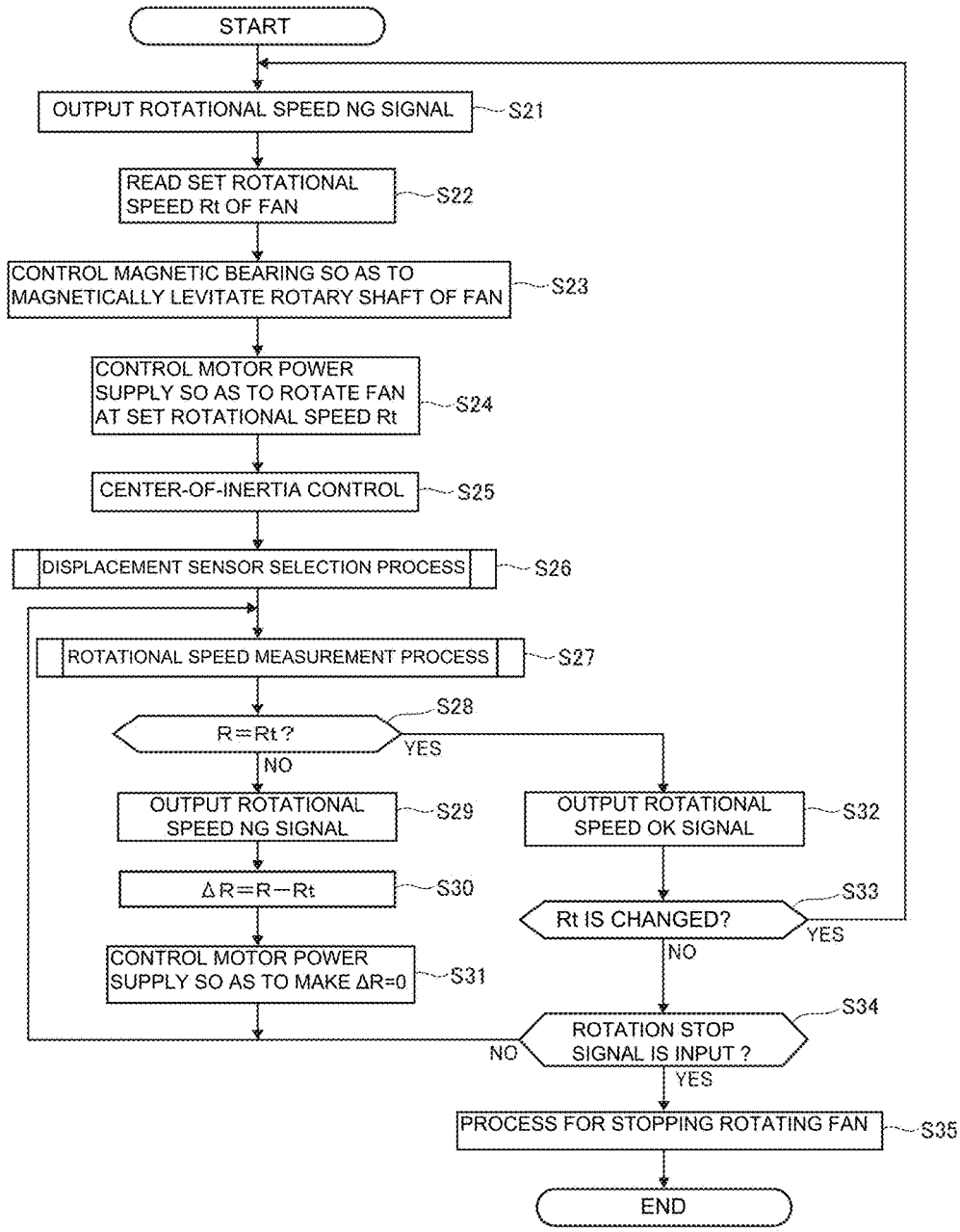
FIG. 19 is a flowchart schematically illustrating a process sequence performed by the magnetic bearing controller involved in the third embodiment.

FIG. 19 is a flowchart schematically illustrating a process sequence performed by the magnetic bearing controller 90 involved in the third embodiment.

In steps S21 to S25, the magnetic bearing controller 90 may perform the same processes as in steps S1 to S5 shown in FIG. 9.

In step S26, the magnetic bearing controller 90 may perform a displacement sensor selection process using the displacement sensor selector 904.

The displacement sensor selection process may be a process for selecting one displacement sensor 60 for use in measuring the rotational speed of a fan 40 from among the displacement sensors 60 included in the magnetic bearing system 5.

The detail of the displacement sensor selection process will be described later using FIG. 20.

In step S27, the magnetic bearing controller 90 may perform a rotational speed measurement process.

The detail of the rotational speed measurement process will be described later using FIG. 21.

In step S28, the magnetic bearing controller 90 may determine whether or not a measured rotational speed R of the fan 40 coincides with a target rotational speed Rt.

The magnetic bearing controller 90 may proceed to step S32 when the measured value R coincides with the target rotational speed Rt. Meanwhile, the magnetic bearing controller 90 may proceed to step S29 when the measured value R does not coincide with the target rotational speed Rt.

In steps S29 to S32, the magnetic bearing controller 90 may carry out the same processes as in steps S8 to S11 shown in FIG. 9.

The magnetic bearing controller 90 may proceed to step S27 after step S31.

In step S33, the magnetic bearing controller 90 may determine whether or not the target rotational speed Rt is changed.

If the target rotational speed Rt is changed, the magnetic bearing controller 90 may proceed to step S21. Meanwhile, the magnetic bearing controller 90 may proceed to step S34 if the target rotational speed Rt is not changed.

In step S34, the magnetic bearing controller 90 may determine whether or not a signal instructing to stop rotating the fan 40 is fed from the laser controller 30.

If no instruction to stop rotating the fan 40 is received, the magnetic bearing controller 90 may proceed to step S27. Meanwhile, the magnetic bearing controller 90 may proceed to step S35 upon receipt of the instruction to stop rotating the fan 40.

In step S35, the magnetic bearing controller 90 may carry out the same process as in step S14 shown in FIG. 9.

Thereafter, the magnetic bearing controller 90 may terminate the process sequence shown in FIG. 19.

Figure 20:
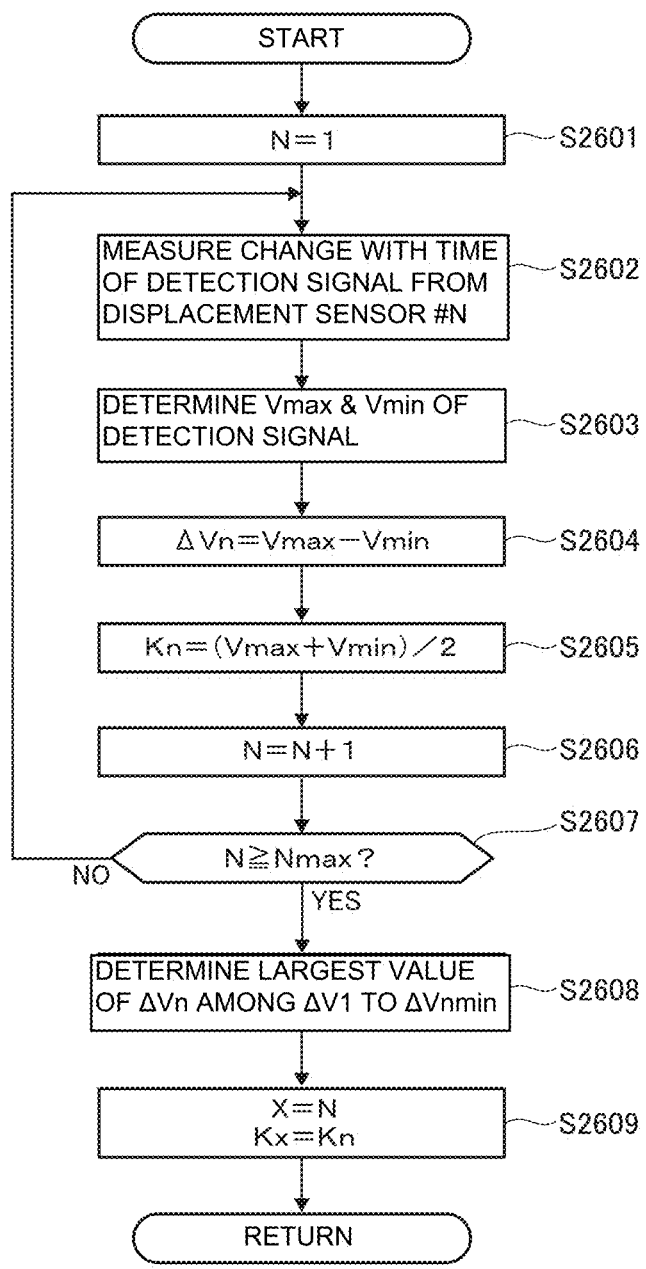
FIG. 20 is a flowchart illustrating a displacement sensor selection process in step S26 of FIG. 19.

FIG. 20 is a flowchart illustrating the displacement sensor selection process in step S26 of FIG. 19.

In step S2601, the magnetic bearing controller 90 may set a displacement sensor number N at 1.

The displacement sensor number N may be a serial number assigned for identification to each of the displacement sensors 60 included in the magnetic bearing system 5. In the example shown in FIG. 18, the displacement sensor number N may be a serial number assigned each individually to the first radial displacement sensors 61a to 61d, the second radial displacement sensors 62a to 62d and the axial displacement sensors 63a and 63b.

Alternatively, the displacement sensor number N may be a serial number given only to each of those displacement sensors 60 which are candidates to serve for measurement of the rotational speed of the fan 40 among all displacement sensors 60 included in the magnetic bearing system 5. In this configuration, the candidate displacement sensors 60 selected for measuring the rotational speed of the fan 40 preferably consist of at least one of the first radial displacement sensors 61, at least one of the second radial displacement sensors 62 and at least one of the axial displacement sensors 63.

In step S2601, the magnetic bearing controller 90 may set the displacement sensor number N according to the following equation:

$$N=1$$

In step S2602, the magnetic bearing controller 90 may measure the change with time of a detection signal output from the displacement sensor 60 which is assigned with the set displacement sensor number N.

Specifically, the magnetic bearing controller 90 may measure the change with time of an AD value from one AD converter circuit 902 that is connected to the displacement sensor 60 assigned with the set displacement sensor number N, by reading and storing the AD value at predetermined time intervals. The predetermined time interval may be approximately not more than one tenth of the cycle length of the detection signal from the displacement sensor 60.

In step S2603, the magnetic bearing controller 90 may determine a maximum value Vmax and a minimum value Vmin of the detection signal output from the displacement sensor 60 which is assigned with the set displacement sensor number N.

The magnetic bearing controller 90 may determine a maximum value Vmax and a minimum value Vmin among multiple AD values stored in step S2602.

In step S2604, the magnetic bearing controller 90 may calculate a difference ΔVn between the maximum value Vmax and the minimum value Vmin.

The magnetic bearing controller 90 may calculate the difference ΔVn according to the following equation:

$$\Delta Vn = V\text{max} - V\text{min}$$

In step S2605, the magnetic bearing controller 90 may calculate a threshold Kn.

The threshold value Kn may be equivalent to the threshold value K described with reference to FIG. 11, which is a threshold value K to the detection signal output from the displacement sensor 60 assigned with the displacement sensor number N.

The threshold value Kn may be a mean value between possible maximum and minimum values that the detection signal from the displacement sensor 60 as signed with the displacement sensor number N can take.

The magnetic bearing controller 90 may calculate the threshold value Kn according to the following equation:

$$Kn = (V\text{max} + V\text{min})/2$$

However, the threshold value Kn may not necessarily be the mean value insofar as the value falls within the possible range of the detection signal from the displacement sensor 60 assigned with the displacement sensor number N.

In step S2606, the magnetic bearing controller 90 may revise the displacement sensor number N.

The magnetic bearing controller 90 may revise the displacement sensor number N with an increment represented by the following equation:

$$N = N+1$$

In step S2607, the magnetic bearing controller 90 may determine whether or not the revised displacement sensor number N is equal to or greater than a number Nmax.

The number Nmax may be the total number of displacement sensors 60 included in the magnetic bearing system 5. In the example shown in FIG. 18, the number Nmax may be "10" that is the sum of the number of first radial displacement sensors 61a to 61d, the number of second radial displacement sensors 62a to 62d and the number of axial displacement sensors 63a and 63b.

In an alternative, in a case that one of the first radial displacement sensors 61, one of the second radial displacement sensors 62 and one of the axial displacement sensors 63 are selected as the candidate displacement sensors 60 to serve for measuring the rotational speed of the fan 40 and assigned with respective displacement sensor numbers, the number Nmax may be "3".

If the revised displacement sensor number N is less than Nmax, the magnetic bearing controller 90 may proceed to step S2602. Meanwhile, if the revised displacement sensor number N is not less than Nmax, the magnetic bearing controller 90 may proceed to step S2608.

In step S2608, the magnetic bearing controller 90 may determine the largest value ΔVn among the differences ΔV1 to ΔVnmax. Then, the magnetic bearing controller 90 may determine the displacement sensor number N corresponding to the determined value ΔVn and the corresponding threshold value Kn.

Specifically, the magnetic bearing controller 90 may select one displacement sensor 60 that can provide the widest range of detection signal as the displacement sensor 60 to serve for the rotational speed measurement of the fan 40.

In step S2609, the magnetic bearing controller 90 may set up the displacement sensor number N and the corresponding threshold value Kn, determined in step S2608, as a displacement sensor number X and a threshold value Kx for the displacement sensor 60 to be used for measuring the rotational speed of the fan 40.

The magnetic bearing controller 90 may determine the displacement sensor number X and the threshold value Kx according to the following equations:

$$X=N$$

$$Kx=Kn$$

Thereafter, the magnetic bearing controller 90 may terminate the displacement sensor selection process and proceed to step S27 of FIG. 19.

Figure 21:
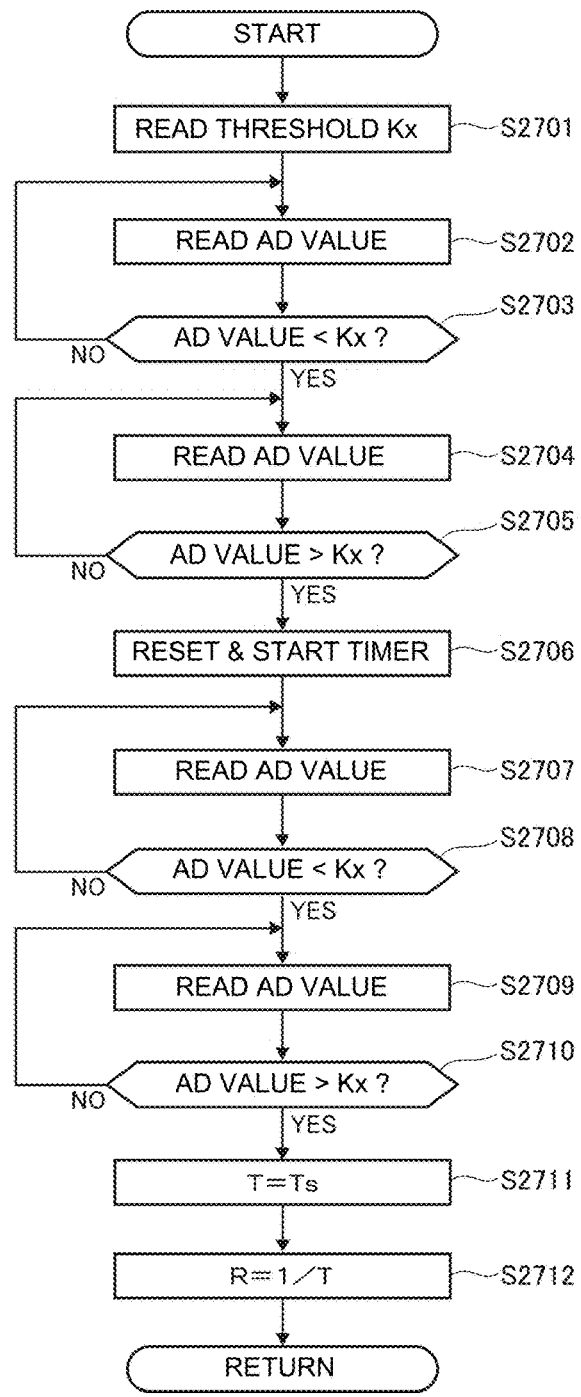
FIG. 21 is a flowchart illustrating a rotational speed measurement process in step S27 of FIG. 19.

FIG. 21 is a flowchart illustrating the rotational speed measurement process in step S27 of FIG. 19.

In step S2701, the magnetic bearing controller 90 may read the threshold value Kx corresponding to the displacement sensor 60 with the displacement sensor number X, which is to be used for measuring the rotational speed of the fan 40.

In step S2702, the magnetic bearing controller 90 may read the AD value of one AD converter circuit 902 which is connected to the displacement sensor 60 with the displacement sensor number X.

In step S2703, the magnetic bearing controller 90 may determine whether or not the read AD value is less than the threshold value Kx.

If the AD value is not less than the threshold value Kx, the magnetic bearing controller 90 may proceed to step S2702. Meanwhile, if the AD value is less than the threshold value Kx, the magnetic bearing controller 90 may proceed to step S2704.

In step S2704, the magnetic bearing controller 90 may read again the AD value of the AD converter circuit 902 connected to the displacement sensor 60 with the displacement sensor number X.

In step S2705, the magnetic bearing controller 90 may determine whether or not the read AD value is more than the threshold value Kx.

If the AD value is not more than the threshold value Kx, the magnetic bearing controller 90 may proceed to step S2704. Meanwhile, if the AD value is more than the threshold value Kx, the magnetic bearing controller 90 may proceed to step S2706.

In step S2706, the magnetic bearing controller 90 may reset and restart the timer 901.

As described above, the time point at which the AD value exceeds the threshold value Kx can correspond to the time point at which the voltage of the detection signal from the displacement sensor 60 with the displacement sensor number X exceeds the voltage of the threshold value Kx.

In step S2707, the magnetic bearing controller 90 may read the AD value of the AD converter circuit 902 connected to the displacement sensor 60 with the displacement sensor number X.

In step S2708, the magnetic bearing controller 90 may determine whether or not the read AD value is less than the threshold value Kx.

If the AD value is not less than the threshold value Kx, the magnetic bearing controller 90 may proceed to step S2707. Meanwhile, if the AD value is less than the threshold value Kx, the magnetic bearing controller 90 may proceed to step S2709.

In step S2709, the magnetic bearing controller 90 may read again the AD value of the AD converter circuit 902 connected to the displacement sensor 60 with the displacement sensor number X.

In step S2710, the magnetic bearing controller 90 may determine whether or not the read AD value is more than the threshold value Kx.

If the AD value is not more than the threshold value Kx, the magnetic bearing controller 90 may proceed to step S2709. Meanwhile, if the AD value is more than the threshold value Kx, the magnetic bearing controller 90 may proceed to step S2711.

In step S2711, the magnetic bearing controller 90 may read the count Ts of the timer 901 and determine the count Ts of the timer 901 as the cycle length T.

As described above, the time point at which the AD value exceeds the threshold value Kx can correspond to the time point at which the voltage of the detection signal from the displacement sensor 60 with the displacement sensor number X exceeds the voltage of the threshold value Kx.

Thus, the count Ts can indicate the time interval between two successive time points at which the AD value exceeds the threshold value Kx. Accordingly, the count Ts can indicate the cycle length T of the detection signal from the displacement sensor 60 with the displacement sensor number X.

The magnetic bearing controller 90 may calculate the cycle length T according to the following equation:

$$T=Ts$$

In step S2712, the magnetic bearing controller 90 may calculate the reciprocal of the cycle length T to determine the calculated value as the measured value R of the rotational speed of the fan 40.

The magnetic bearing controller 90 may calculate the measured value R of the rotational speed of the fan 40 according to the following equation:

$$R = 1/T$$

Thereafter, the magnetic bearing controller 90 may terminate the rotational speed measurement process of FIG. 21 and then proceed to step S28 of FIG. 19.

Other features of the magnetic bearing system 5 involved in the third embodiment may be similar to those of the magnetic bearing system 5 involved in the first and second embodiments.

As described so far, the magnetic bearing controller 90 involved in the third embodiment can select one displacement sensor 60 that can provide the widest range of detection signal, from among the displacement sensors 60 of the magnetic bearing system 5, including the first and second radial displacement sensors 61 and 62 and the axial displacement sensors 63. Then, the magnetic bearing controller 90 involved in the third embodiment can measure multiple time points at which the AD value of the selected detection signal exceeds the threshold value Kx, and determine the cycle length T of the detection signal by the time interval between the multiple time points. Then, the magnetic bearing controller 90 may measure the rotational speed of the fan 40 by calculating the reciprocal of the determined cycle length T.

Therefore, the magnetic bearing system 5 involved in the third embodiment can measure the rotational speed of the fan 40 properly without the rotation detector section 540 shown in FIG. 1 to FIG. 3, like the magnetic bearing system 5 involved in the first and second embodiments.

Furthermore, the magnetic bearing system 5 involved in the third embodiment can measure the rotational speed of the fan 40 on the basis of the detection signal from one displacement sensor 60 that can provide the detection signal in the widest range. Therefore, the magnetic bearing system 5 involved in the third embodiment can improve the design flexibility of the threshold value Kx and measure the time points at which the AD value of the detection signal exceeds the threshold value Kx more precisely even if the detection signal suffers noises or the like.

Thereby, the magnetic bearing system 5 involved in the third embodiment can simplify the device configuration and save the cost, as well as enable highly accurate measurement on the rotational speed of the fan 40.

As a result, the gas laser apparatus 1 according to the third embodiment can improve the accuracy of measurement on the rotational speed of the fan 40 while addressing the issue of lowering the cost.

Note that the magnetic bearing controller 90 involved in the third embodiment may rotate the fan 40 not about the center of inertia but about the geometric center.

Furthermore, in the magnetic bearing system 5 involved in the third embodiment, the displacement sensor selector 904 may be configured as a hardware device including a multiplexer, not as a software device.

In the magnetic bearing system 5 involved in the third embodiment, the rotation detecting circuit 95 may be configured as a hardware device not as a software function.

8. Magnetic Bearing System in Gas Laser Apparatus of Fourth Embodiment

Figure 22:
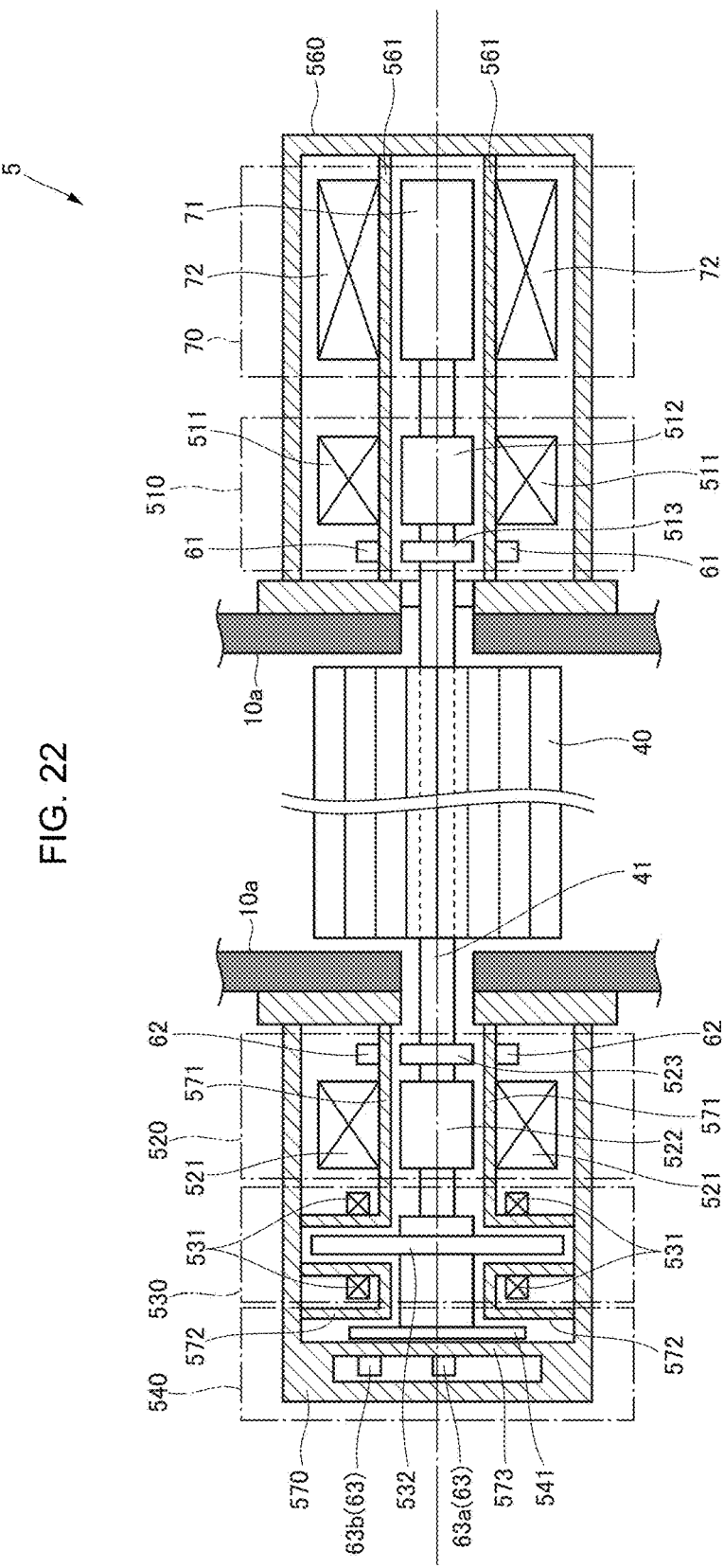
FIG. 22 is a diagram illustrating a magnetic bearing system involved in a fourth embodiment.
Figure 23:
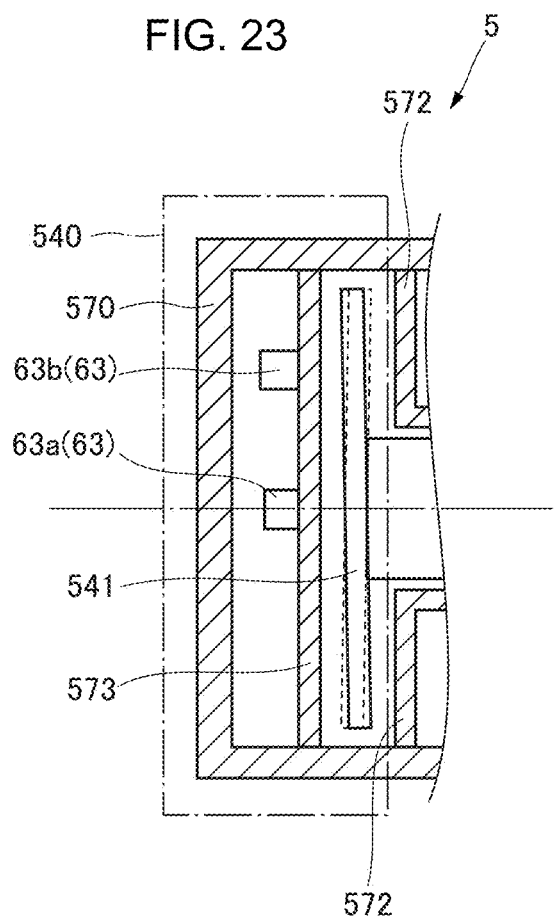
FIG. 23 is an enlarged view of a rotation detector section 540 shown in FIG. 22.

Referring to FIG. 22 and FIG. 23, a magnetic bearing system 5 provided in a gas laser apparatus 1 according to the fourth embodiment will be described.

The magnetic bearing system 5 involved in the fourth embodiment may include the rotation detector section 540 shown in FIG. 1 to FIG. 3. However, the rotation detector section 540 involved in the fourth embodiment may also have a different configuration from the rotation detector section 540 shown in FIG. 1 to FIG. 3.

Furthermore, the magnetic bearing system 5 involved in the fourth embodiment may include the same rotation detecting circuit 95 as the magnetic bearing system 5 involved in the second embodiment.

The description of the same features of the gas laser apparatus 1 of the fourth embodiment as those of the gas laser apparatus 1 shown in FIG. 1 to FIG. 3 will be omitted.

FIG. 22 is a diagram illustrating a magnetic bearing system 5 involved in the fourth embodiment. FIG. 23 is an enlarged view of the rotation detector section 540 shown in FIG. 22.

Axial displacement sensors 63 involved in the fourth embodiment may consist of multiple axial displacement sensors 63a and 63b.

The axial displacement sensor 63a may be spaced a predetermined distance in the axial direction from a disk 541 fixed on a rotary shaft 41, like the axial displacement sensor 63 shown in FIG. 2.

The axial displacement sensor 63a may be disposed outside a can 573 in a casing 570.

The axial displacement sensor 63a may be disposed to face the disk 541 fixed on the rotary shaft 41, across the can 573.

The axial displacement sensor 63a may be disposed to face the disk 541 fixed on the rotary shaft 41 at about the center of the disk 541. The axial displacement sensor 63a may be located substantially on the extension line from the rotary shaft 41.

The axial displacement sensor 63b may be spaced a predetermined distance in the axial direction from the disk 541 fixed on the rotary shaft 41.

The axial displacement sensor 63b may be disposed outside a can 573 in the casing 570.

The axial displacement sensor 63b may be disposed to face the disk 541 fixed on the rotary shaft 41, across the can 573.

The axial displacement sensor 63b may be disposed to face the disk 541 fixed on the rotary shaft 41 in a peripheral portion of the disk 541. The axial displacement sensor 63b may be located apart from the extension line from the rotary shaft 41.

The rotation detector section 540 involved in the fourth embodiment may include the disk 541. The rotation detector section 540 involved in the fourth embodiment may not necessarily include the rotation sensor 542.

The disk 541 may be a target of the multiple axial displacement sensors 63a and 63b.

The disk 541 may be formed of a metal material that hardy reacts with the laser gas. The disk 541 may be formed of at least one of copper, nickel, gold, aluminum and permalloy, for example, and the surface may be treated with nickel platting.

The disk 541 may be formed to have a substantially round shape.

The disk 541 may be fixed on the rotary shaft 41 at a position located in the casing 570. The position at which the disk 541 is fixed on the rotary shaft 41 may be an end of the rotary shaft 41.

Like the disk 532 described above with regard to the second embodiment, the disk 541 fixed on the rotary shaft 41 can often turn in a position slightly inclined to a perpendicular plane to the center line of the rotary shaft 41.

In that case, the peripheral portion of the disk 541 can get closer to and away from the axial displacement sensor 63*b* along with the rotation of the fan 40.

Therefore, regardless of whether the fan 40 is rotated about the center of inertia or the geometric center, the distance from the axial displacement sensor 63*b* to the disk 541 can change periodically with each rotation of the fan 40.

As a result, the axial displacement sensor 63*b* can output a detection signal of which the intensity changes periodically along with the periodically changing distance to the disk 532.

For example, the axial displacement sensor 63*b* can output a periodically changing detection signal, like the detection signal shown in FIG. 17.

The magnetic bearing system 5 involved in the fourth embodiment may have the same electric configuration as the magnetic bearing system 5 involved in the second embodiment shown in FIG. 16.

Accordingly, the magnetic bearing system 5 involved in the fourth embodiment may include a rotation detecting circuit 95 configured using a comparator 951, and the comparator 951 may be fed with the detection signal from the axial displacement sensor 63*b*.

On the basis of the output signal of the comparator 951, a magnetic bearing controller 90 involved in the fourth embodiment can measure multiple time points at which the voltage of the detection signal from the axial displacement sensor 63*b* exceeds a threshold voltage Vs, and determine the cycle length T of the detection signal by the time interval between the multiple time points. Then, the magnetic bearing controller 90 may measure the rotational speed of the fan 40 by calculating the reciprocal of the cycle length T.

Other features of the magnetic bearing system 5 involved in the fourth embodiment may be the same as those of the magnetic bearing system 5 shown in FIG. 1 to FIG. 3.

Thus, the magnetic bearing system 5 involved in the fourth embodiment can measure the rotational speed of the fan 40 even while the magnetic bearing controller 90 does not include the rotation sensor 542.

Furthermore, as the magnetic bearing system 5 involved in the fourth embodiment does not include the rotation sensor 542, the disk 541 is not required to form from an expensive magnetic material such as permalloy.

Namely, the magnetic bearing system 5 involved in the fourth embodiment can measure the rotational speed of the fan 40 properly even while the disk 541 is formed of a low price metal material. For example, even if the disk 541 is formed of copper or aluminum and the surface is treated with nickel platting, the magnetic bearing system 5 involved in the fourth embodiment can measure the rotational speed of the fan 40 properly.

Therefore, the magnetic bearing system 5 involved in the fourth embodiment can save the cost.

As a result, the gas laser apparatus 1 according to the fourth embodiment can save the cost.

Note that the disk 541 involved in the fourth embodiment may be intentionally configured to incline to the perpendicular plane to the center line of the rotary shaft 41.

Furthermore, in the magnetic bearing controller 90 involved in the fourth embodiment, the rotation detecting circuit 95 may be configured as a software function.

The magnetic bearing controller 90 involved in the fourth embodiment may rotate the fan 40 either about the center of inertia or the geometric center.

8.1 Modification 1 of Fourth Embodiment

Figure 24:
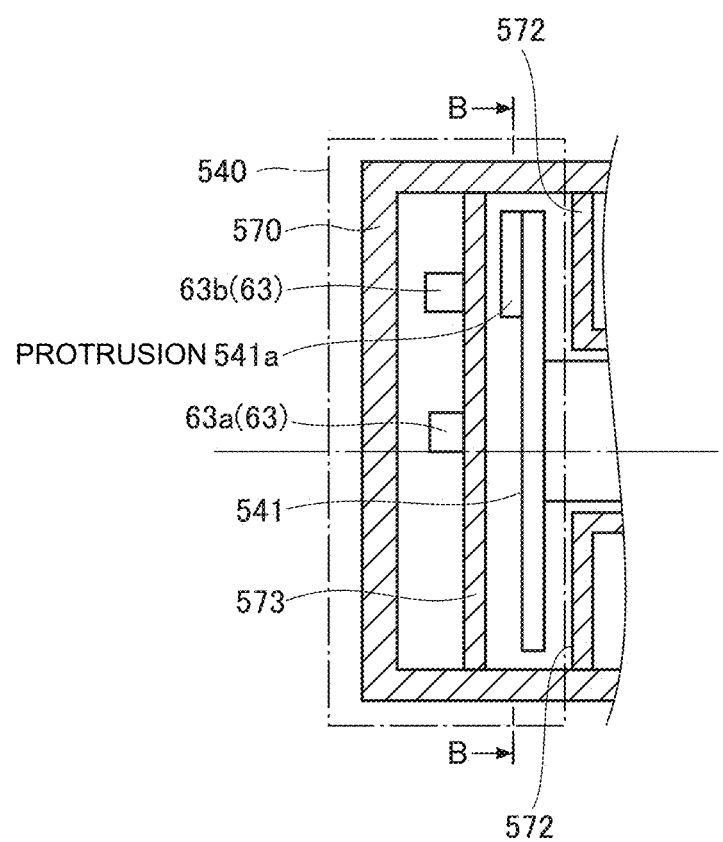
FIG. 24 is a diagram illustrating a magnetic bearing system involved in modification 1 of the fourth embodiment.
Figure 25:
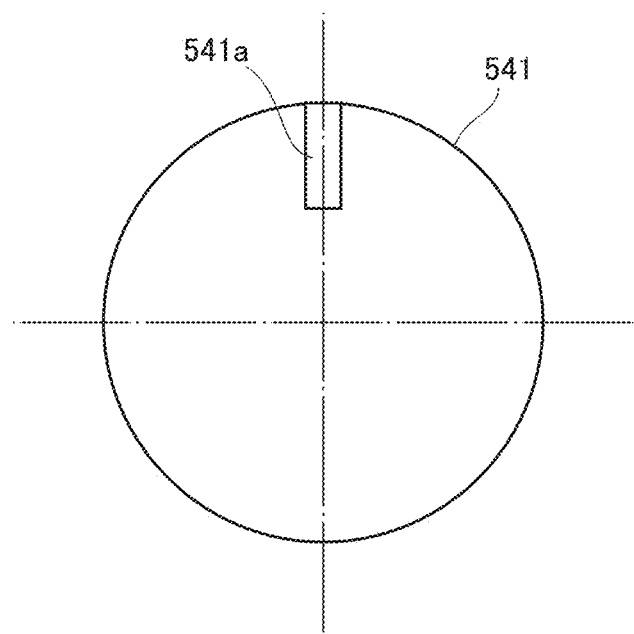
FIG. 25 is a view of a disk seen from the direction to a line B-B shown in FIG. 24.
Figure 26:
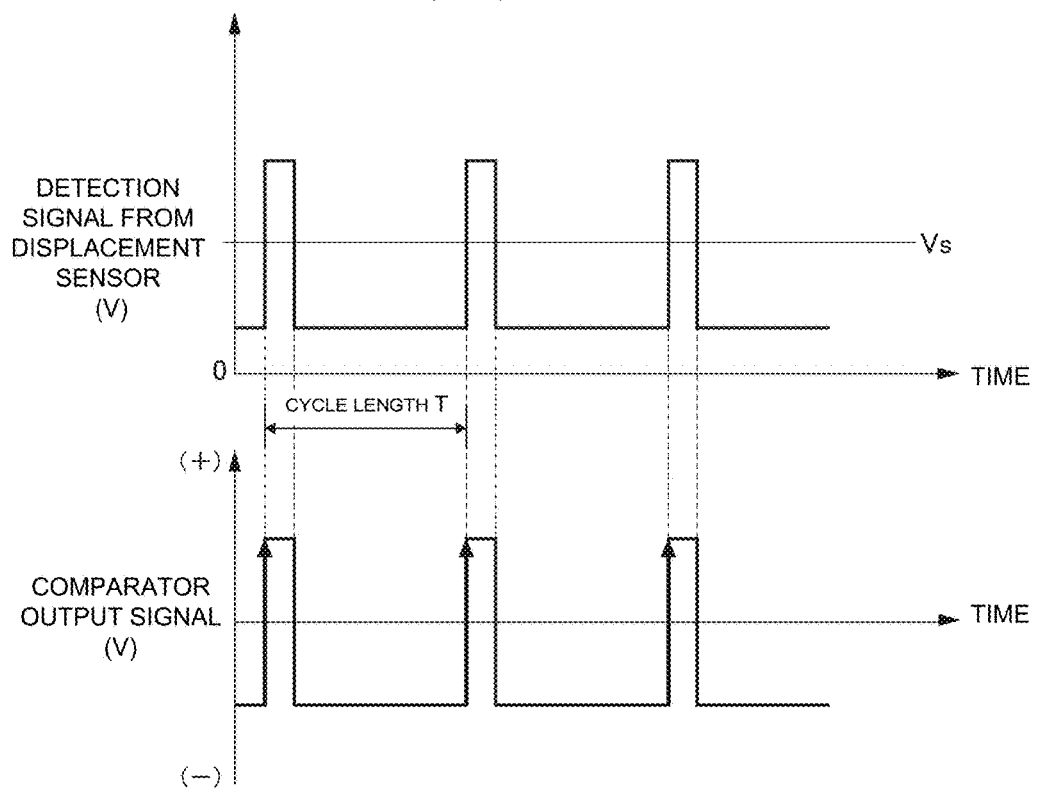
FIG. 26 is a signal chart illustrating a relationship between a detection signal from an axial displacement sensor involved in modification 1 of the fourth embodiment and an output signal from a comparator constituting a rotation detecting circuit.

Referring to FIG. 24 to FIG. 26, a magnetic bearing system 5 provided in a gas laser apparatus 1 according to modification 1 of the fourth embodiment will be described.

The magnetic bearing system 5 involved in modification 1 of the fourth embodiment may have a disk 541 of a different configuration from the disk 541 involved in the fourth embodiment.

The description on those features of the gas laser apparatus 1 of modification 1 of the fourth embodiment which are similar to those of the gas laser apparatus 1 of the fourth embodiment will be omitted.

FIG. 24 is a diagram illustrating a magnetic bearing system 5 involved in modification 1 of the fourth embodiment. FIG. 25 is a view of the disk 541 seen from the direction to a line B-B shown in FIG. 24.

FIG. 26 is a signal chart illustrating a relationship between a detection signal from an axial displacement sensor involved in modification 1 of the fourth embodiment and an output signal from a comparator 951 constituting a rotation detecting circuit 95.

The disk 541 involved in modification 1 of the fourth embodiment may be provided with a protrusion 541*a*.

The protrusion 541*a* may be formed of a metal material that hardy reacts with the laser gas. The first sensor target 513 may be formed of at least one of copper, nickel, gold, aluminum and permalloy, for example, and the surface may be treated with nickel platting.

The protrusion 541*a* may be disposed in a peripheral portion of the disk 541. The axial protrusion 541 may be located apart from the extension line from the rotary shaft 41.

The protrusion 541*a* may be disposed to face the axial displacement sensor 63*b* across a can 573.

During the rotation of the fan 40, the distance between the axial displacement sensor 63*b* and the disk 541 can get shorter only when the protrusion 541*a* faces the axial displacement sensor 63*b*.

Therefore, regardless of whether the fan 40 is rotated about the center of inertia or the geometric center, the distance between the axial displacement sensor 63*b* and the disk 541 can change periodically with each rotation of the fan 40.

As a result, the axial displacement sensor 63*b* can output an analog detection signal of which intensity changes periodically according to the periodically changing distance to the disk 541.

For example, the axial displacement sensor 63*b* can output a periodically changing detection signal shown in FIG. 26.

Other features of the magnetic bearing system 5 involved in modification 1 of the fourth embodiment may be the same as those of the magnetic bearing system 5 involved in the fourth embodiment.

According to the aforementioned configuration, the magnetic bearing controller 90 involved in modification 1 of the fourth embodiment can measure, on the basis of the output signal of the comparator 951, multiple time points at which the voltage of the detection signal from the axial displacement sensor 63*b* exceeds a threshold voltage Vs. Therefore, the magnetic bearing controller 90 can determine the cycle length T of the detection signal by the time interval between the multiple time points. Then, the magnetic bearing controller 90 can measure the rotational speed of the fan 40 by calculating the reciprocal of the determined cycle length T.

Thus, like the fourth embodiment, the magnetic bearing system 5 involved in modification 1 of the fourth embodiment can properly measure the rotational speed of the fan 40 and save the cost.

The disk 541 involved in modification 1 of the fourth embodiment is provided with one protrusion 541*a* in the example shown in FIG. 24 and FIG. 25, but may be provided with multiple protrusions 541*a*. The multiple protrusions 541*a* may be spaced at approximately equal intervals in the circumferential direction of the rotary shaft 41.

Alternatively, the disk 541 involved in modification 1 of the fourth embodiment may be provided with a recess in place of the protrusion 541*a*.

In the magnetic bearing controller 90 involved in modification 1 of the fourth embodiment, the rotation detecting circuit 95 may be configured as a software function.

The magnetic bearing controller 90 involved in modification 1 of the fourth embodiment may rotate the fan 40 about the center of inertia or the geometric center.

9. Others

9.1 Concrete Example of Displacement Sensor

Figure 27:
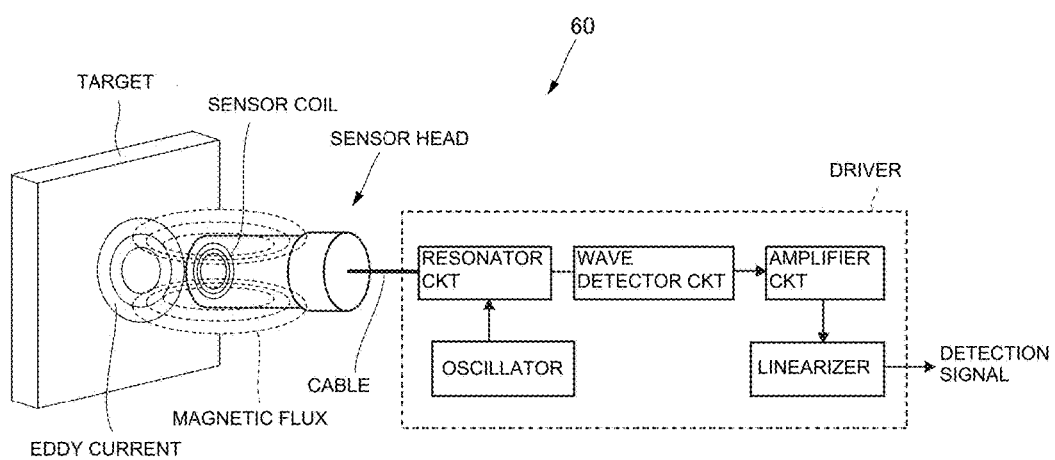
FIG. 27 is a diagram illustrating a configuration of an eddy current type displacement sensor.

Referring to FIG. 27, a concrete example of the displacement sensor 60, including the first and second radial displacement sensors 61 and 62 and the axial displacement sensor 63, will be described.

FIG. 27 is a diagram illustrating a configuration of an eddy current type displacement sensor.

The displacement sensor 60 may be an eddy current type displacement sensor.

The eddy current type displacement sensor may be a contactless displacement sensor.

The eddy current type displacement sensor may include a sensor head, a cable and a driver.

A target to be measured by the eddy current type displacement sensor may be a metal material that is at least electrically conductive.

A sensor coil may be provided in the sensor head.

The cable may electrically interconnect the sensor head and the driver.

The driver may include an oscillator, a resonator circuit, a wave detector circuit, an amplifier circuit and a linearizer.

The eddy current type displacement sensor may supply a high frequency signal from the oscillator through the resonator circuit to the sensor coil.

The sensor coil can generate a magnetic flux at a high frequency corresponding to the high frequency signal.

The magnetic flux can cause an eddy current on the surface of the target to be measured.

The magnitude of the eddy current can vary according to the distance between the sensor coil and the target.

With a change in distance between the sensor coil and the target changes, the impedance of the sensor coil including the target can change with reference to that on the side of the resonator circuit. Therefore, the change in distance between the sensor coil and the target can be captured as a change in impedance of the sensor coil. The change in impedance can be output as a change in output voltage from the resonator circuit to the wave detector circuit.

The wave detector circuit can convert the output voltage of the resonator circuit to a DC voltage which is proportional to the distance between the sensor coil and the target, and output the DC voltage to the linearizer via the amplifier circuit.

The linearizer can linearize the DC voltage as output from the wave detector circuit via the amplifier circuit, thereby to output a signal representative of the voltage to external devices.

Thus, the displacement sensor 60 constituted of the eddy current type displacement sensor can output a detection signal that represents the voltage proportional to the distance between the sensor coil and the target.

Incidentally, the displacement sensor 60 is not limited to the eddy current type displacement sensor but may be any contactless displacement sensor, such as an inductive displacement sensor or a capacitive displacement sensor.

9.2 Hardware Environment of Each Controller

It would be appreciated for a person skilled in the art that the subject mentioned here can be executed by a combination of a universal computer or a programmable controller with a program module or a software application. Generally, the program module includes routine programs, components, data structures and the like, which enable executing the processes described in the present disclosure.

Figure 28:
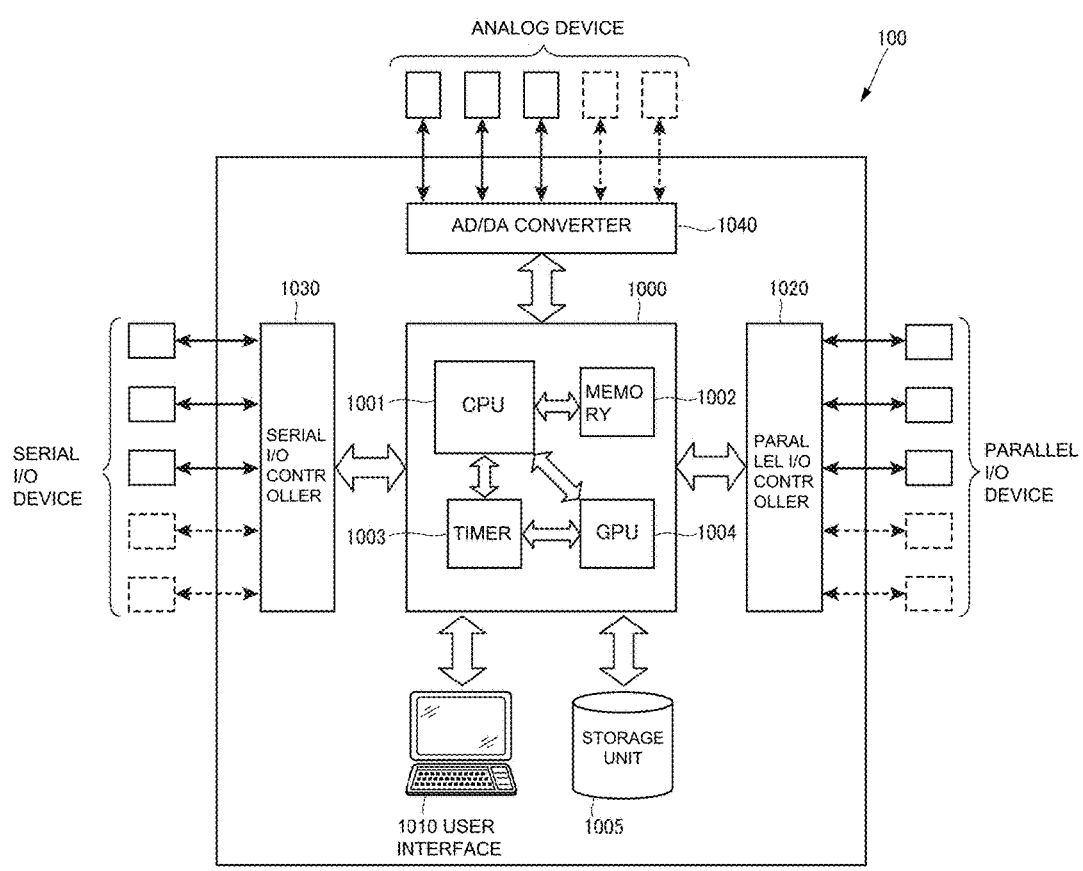
FIG. 28 is a block diagram illustrating hardware environments of respective controllers.

FIG. 28 is a block diagram illustrating an example of hardware environment which enables implementation of various aspects of the disclosed subject. The example of hardware environment 100 shown in FIG. 28 may include a processor unit 1000, a storage unit 1005, a user interface 1010, a parallel I/O controller 1020, a serial I/O controller 1030 and an AD/DA converter 1040, but the hardware environment 100 is not limited to this configuration.

The processor unit 1000 may include a central processing unit (CPU) 1001, a memory 1002, a timer 1003 and an image processing unit (GPU) 1004. The memory 1002 may include a random access memory (RAM) and a read-only memory (ROM). The CPU 1001 may be any of processors available in the market. A dual microprocessor or any of other multi-processor architectures may serve as the CPU 1001.

The components shown in FIG. 28 may be interconnected with each other so as to carry out the processes described in the present disclosure.

In the operation, the processor unit 1000 may read a program from the storage unit 1005 and execute the same. In addition, the processor unit 1000 may read data together with the program from the storage unit 1005. Furthermore, the processor unit 1000 may write data on the storage unit 1005. The CPU 1001 may execute the program read from the storage unit 1005. The memory 1002 may be a work memory for temporary storage of the program to be executed by the CPU 1001 and data to be used for operation of the CPU 1001. The timer 1003 may measure the time interval and output the result of measurement to the CPU 1001 according to the execution of the program. The GPU 1004 may process image data according to the program read from the storage unit 1005 and output the processing result to the CPU 1001.

A parallel I/O controller 1020 may be connected to parallel I/O devices, such as the exposure device controller 111, the laser controller 30, the magnetic bearing controller 90, the charger 16, the first radial magnetic bearing section 510, the second radial magnetic bearing section 520, the axial magnetic bearing section 530, the motor 70 and the motor power supply 80, which are communicable with the processor unit 1000, and the parallel I/O controller 1020 may control communication between the processor unit 1000 and these parallel I/O devices. A serial I/O controller 1030 may be connected to serial I/O devices, such as the pulse power module 17 and the gas ventilator 22, which are communicable with the processor unit 1000. The serial I/O controller 1030 may control communication between the processor unit 1000 and these serial I/O devices. An AD/DA converter 1040 may be connected through analog ports to analog devices, such as the light sensor 20c, the pressure sensor 21, the rotation sensor 542, the displacement sensor 60, the amplifier 91, and the rotation detecting circuit 95. The AD/DA converter 1040 may control communication between the processor unit 1000 and these analog devices and may perform AD or DA conversion of contents communicated with the analog devices.

The user interface 1010 may display the progress of the program currently executed by the processor unit 1000 so that the operator can give instructions to the processor unit 1000, such as stopping the program or executing an interruption routine.

The exemplified hardware environment 100 may be applied to one or more of configurations of the exposure device controller 111, the laser controller 30, the magnetic bearing controller 90 and the like in the present disclosure. A person skilled in the art will appreciate that these controllers may be embodied in a distributed computing environment, that is, an environment where processor units are linked to each other over a communication network to perform tasks. In the present disclosure, the exposure device controller 110, the laser controller 30, the magnetic bearing controller 90 and other components may be interconnected through a communication network, such as the Ethernet and the Internet. In the distributed computing environment, both local and remote memory storage devices may store program modules.

10. 2 Other Modifications

The gas laser apparatus 1 may use a high reflective mirror as an alternative to the line narrowing module 18. Then, in the gas laser apparatus 1, a natural excitation light without being narrowed can be output as a pulse laser light to the exposure device 110.

The gas laser apparatus 1 is not limited to an excimer laser apparatus, but may be a fluorine molecular laser apparatus that uses a laser gas including a fluorine gas as a halogen gas and a buffer gas.

It should be appreciated for a person skilled in the art that the respective features of the above-described embodiments, including the modifications, are applicable to one another.

The foregoing description is intended to be merely illustrative rather than limiting. It should therefore be appreciated for a person skilled in the art that variations may be made in the embodiments of the present disclosure without departing from the scope as defined by the appended claims.

The terms used throughout the specification and the appended claims are to be construed as "open-ended" terms. For example, the term "include" or "included" is to be construed as "including but not limited to". The term "have" is to be construed as "having but not limited to". Also, the modifier "one (a/an)" described in the specification and recited in the appended claims is to be construed to mean "at least one" or "one or more".

What is claimed is:

1. A discharge excitation gas laser apparatus comprising:
a laser chamber in which a laser gas containing a halogen gas is encapsulated;
a pair of discharge electrodes disposed to face each other in the laser chamber;
a fan disposed in the laser chamber to make the laser gas flow between the pair of discharge electrodes;
a motor configured to rotate the fan;
a motor power supply for supplying power to the motor;
a magnetic bearing including a sensor target and a disk, which are fixed on a rotary shaft of the fan, and configured to magnetically levitate the rotary shaft;
displacement sensors including a radial displacement sensor configured to detect the position of a smooth surface of the sensor target in the radial direction of the rotary shaft and an axial displacement sensor configured to detect the position of a smooth surface of the disk in the axial direction of the rotary shaft, and configured to detect the position of the rotary shaft through a can; and
a controller configured to
control the magnetic bearing on the basis of detection signals from the displacement sensors so as to rotate the fan about a center of inertia thereof,
select one displacement sensor from the radial displacement sensor and the axial displacement sensor, the selected displacement sensor providing a detection signal having the largest difference between maximum and minimum values, and
measure the rotational speed of the fan on the basis of the detection signal from the selected displacement sensor and control the motor power supply in such a manner that the measured rotational speed becomes equal to a target rotational speed.

2. The discharge excitation gas laser apparatus as set forth in claim 1, wherein the controller measures the rotational speed of the fan by detecting multiple time points at which the detection signal exceeds a threshold, deriving a cycle length of the detection signal from a time interval between the multiple time points, and calculating the reciprocal of the cycle length.

3. The discharge excitation gas laser apparatus as set forth in claim 2, wherein the threshold is a mean value between the maximum and minimum values of the detection signal.

4. The discharge excitation gas laser apparatus as set forth in claim 1, wherein
the disk is formed of at least one of copper, nickel, gold, aluminum and permalloy.

5. The discharge excitation gas laser apparatus as set forth in claim 4, wherein the displacement sensors are eddy current type displacement sensors.

6. The discharge excitation gas laser apparatus as set forth in claim 1, wherein the controller is further configured to
determine whether the target rotational speed is changed and
select again, if the target rotational speed is changed, one displacement sensor from the radial displacement sensor and the axial displacement sensor providing a detection signal having the largest difference between maximum and minimum values.

* * * * *